United States Patent
Sasanka

(10) Patent No.: US 10,599,573 B2
(45) Date of Patent: *Mar. 24, 2020

(54) OPPORTUNISTIC INCREASE OF WAYS IN MEMORY-SIDE CACHE

(71) Applicant: INTEL CORPORATION, Santa Clara, CA (US)

(72) Inventor: Ruchira Sasanka, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,847

(22) Filed: Nov. 29, 2018

(65) Prior Publication Data

US 2019/0095335 A1    Mar. 28, 2019

Related U.S. Application Data

(63) Continuation of application No. 15/373,701, filed on Dec. 9, 2016, now Pat. No. 10,162,758.

(51) Int. Cl.
| | |
|---|---|
| *G06F 12/00* | (2006.01) |
| *G06F 12/02* | (2006.01) |
| *G06F 12/0864* | (2016.01) |
| *G06F 12/0811* | (2016.01) |
| *G06F 12/084* | (2016.01) |
| *G06F 12/0808* | (2016.01) |
| *G06F 12/128* | (2016.01) |
| *G06F 12/0804* | (2016.01) |

(52) U.S. Cl.
CPC ........ *G06F 12/0864* (2013.01); *G06F 12/084* (2013.01); *G06F 12/0808* (2013.01); *G06F 12/0811* (2013.01); *G06F 12/128* (2013.01); *G06F 12/0804* (2013.01); *G06F 2201/885* (2013.01); *G06F 2212/1021* (2013.01); *G06F 2212/283* (2013.01); *G06F 2212/601* (2013.01); *G06F 2212/6032* (2013.04); *G06F 2212/621* (2013.01); *G06F 2212/70* (2013.01)

(58) Field of Classification Search
CPC combination set(s) only.
See application file for complete search history.

(56) References Cited

U.S. PATENT DOCUMENTS

| | | |
|---|---|---|
| 2004/0268026 A1 | 12/2004 | Royer, Jr. et al. |
| 2006/0069874 A1 | 3/2006 | Desai |

OTHER PUBLICATIONS 6.823 Computer System Architecture, "Direct-mapped Cache", Oct. 15, 2005, 6.823 Fall 2005, Handout #6, 2 pages.

*Primary Examiner* — Yong J Choe
(74) *Attorney, Agent, or Firm* — Lowenstein Sandler LLP

(57) ABSTRACT

A processor includes a processor core and a cache controller coupled to the processor core. The cache controller is to allocate, for a memory, a plurality of cache entries in a cache, wherein the processor core is to: detect an amount of the memory installed in a computing system and, responsive to detecting less than a maximum allowable amount of the memory for the computing system, direct the cache controller to increase a number of ways of the cache in which to allocate the plurality of cache entries.

20 Claims, 15 Drawing Sheets

| Tag (4bits) | Index (29 bits) | Bytes in $line (6bits) |
|---|---|---|

FIGURE 7A

| Unused (2bits) | Tag (4bits) | Index (27 bits) | Bytes in $line (6bits) |
|---|---|---|---|

FIGURE 7B

| Unused (1bit) | Tag (4bits) | Index (28 bits) | Bytes in $line (6bits) |
|---|---|---|---|

FIGURE 7C

| Unused (2bits) | Tag (3bits) | Index (28 bits) | Bytes in $line (6bits) |
|---|---|---|---|

FIGURE 7D

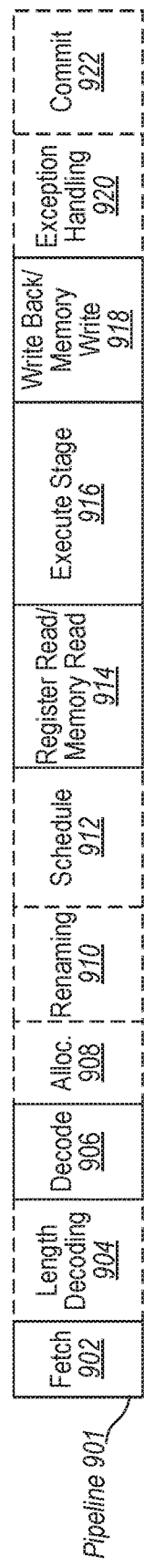
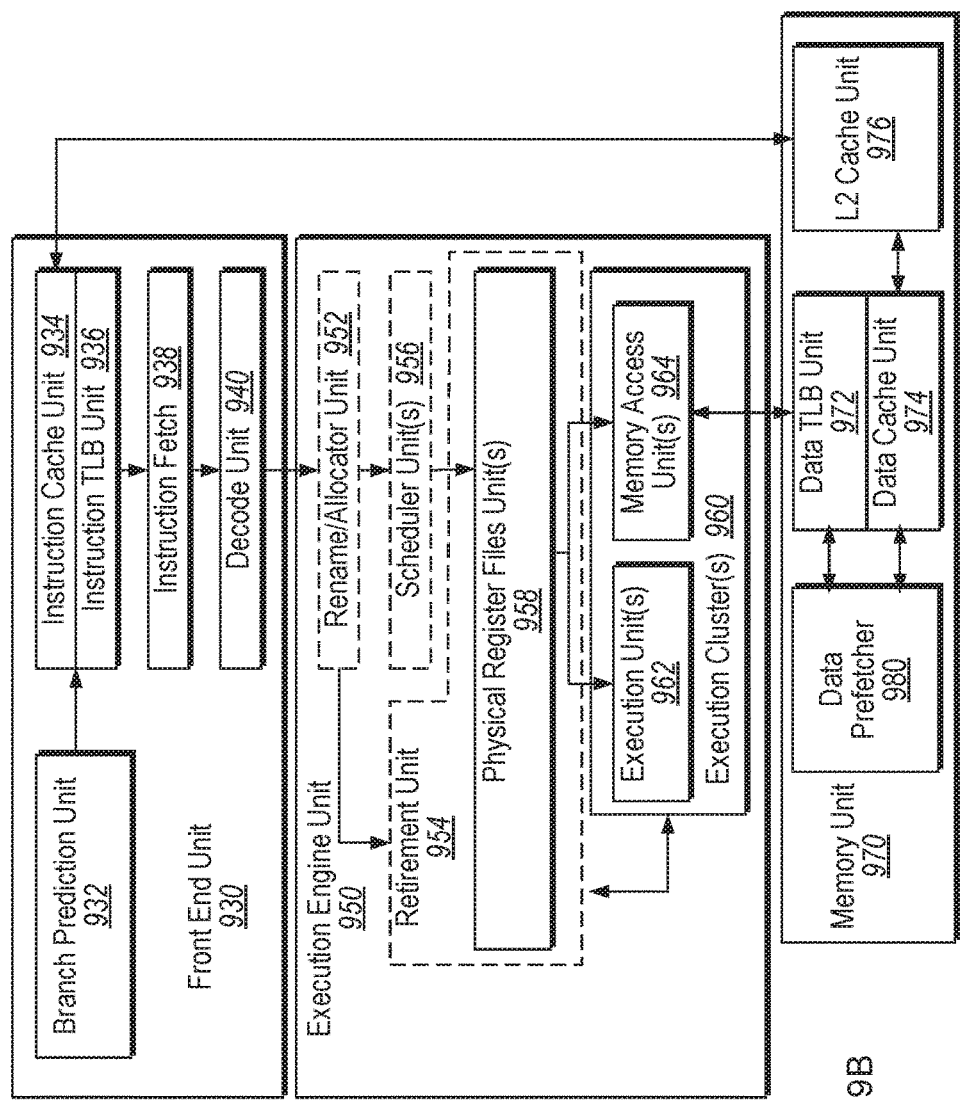
FIGURE 9A
FIGURE 9B

OPPORTUNISTIC INCREASE OF WAYS IN MEMORY-SIDE CACHE

RELATED APPLICATIONS

This application is a continuation of U.S. patent application Ser. No. 15/373,701, filed on Dec. 9, 2016, which is herein incorporated by this reference in its entirety.

TECHNICAL FIELD

The present disclosure relates to the field of memory management and, in particular, to the increase of a number of ways to which to allocate cache entries in a memory-side cache.

BACKGROUND

A cache is a computer component that transparently stores data such that future requests for that data can be provided faster. Data stored in a cache can include unique values that have been computed earlier or duplicates of original values that are stored elsewhere, such as in a far (or main) memory. If requested data is in the cache, this request can be handled by reading the cache, which is comparatively faster than reading far-memory. Otherwise, the requested data is fetched from its original storage location. Thus, requests for data that is in the cache can typically be handled faster than for data that is not in the cache.

Memory-side caches employed today, particularly for high bandwidth memory-side caches, are also high capacity, getting as large as 32 gigabytes (GB) or larger. A result of this large size means storing cache tags for such a cache has become expensive in terms of taking up additional cache memory space. As a result, to reduce cache memory required to store cache tag arrays, large memory-side caches are direct mapped as opposed to set-associative mapped.

BRIEF DESCRIPTION OF THE DRAWINGS

FIG. 7A is a block diagram illustrating addressing of an original 32 GB direct-mapped cache that supports 512 GB capacity of DRAM, according to an embodiment of the present disclosure.

FIG. 7B is a block diagram illustrating reconfigured addressing of the 32 GB cache of FIG. 7A, which instead supports 128 GB of DRAM, as a four-way set-associative cache, according to an embodiment of the present disclosure.

FIG. 7C is a block diagram illustrating reconfigured addressing of the 32 GB cache of FIG. 7A, which instead supports 256 GB of DRAM, as a two-way set-associative cache, according to an embodiment of the present disclosure.

FIG. 7D is a block diagram illustrating reconfigured addressing of the 32 GB cache of FIG. 7A, which instead supports 128 GB of DRAM, as a two-way set associative cache, according to an embodiment of the present disclosure.

FIG. 9A is a block diagram illustrating an in-order pipeline and a register renaming stage, out-of-order issue/execution pipeline according to an embodiment.

FIG. 9B is a block diagram illustrating a micro-architecture for a processor that may reconfigure a memory-side cache with an increase in a number of ways, according to an embodiment of the present disclosure.

DESCRIPTION OF EMBODIMENTS

Figure 1:
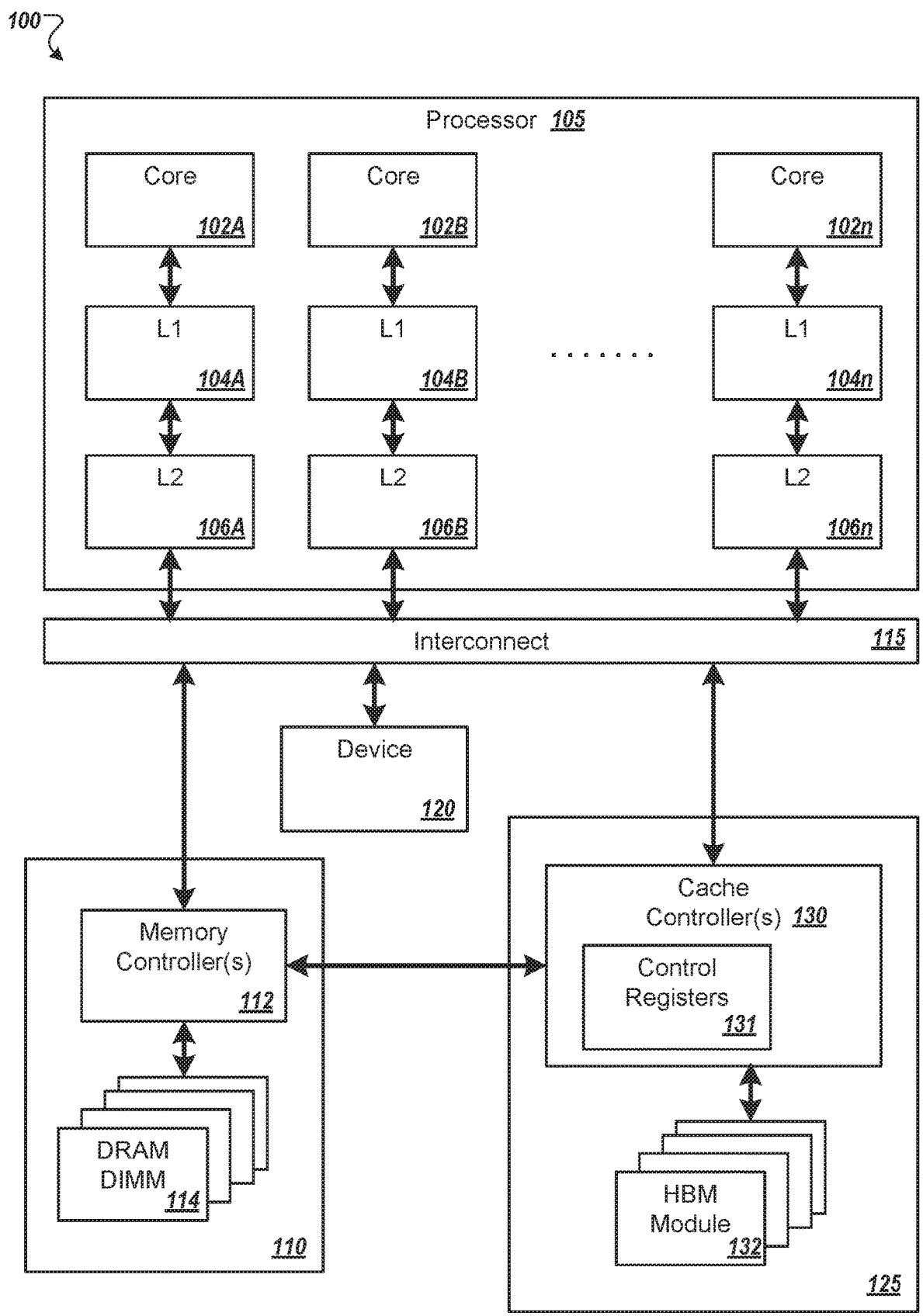
FIG. 1 is a block diagram of an example system architecture that implements high bandwidth memory (HBM) as a memory-side cache (MSC) in a multi-channel direct random access memory (DRAM) system, according to an embodiment of the present disclosure.

Memory-side caches such as multi-channel direct random access memory (MCDRAM) or other high-bandwidth memory (HBM) caches have large capacities such as 16 gigabytes (GB), 32 GB, or larger. These large caches normally act as a cache for storing frequently accessed values from memory (DRAM). Storing cache tags for such caches has become expensive in terms of cache memory to store a metadata array for the cache tags. This has forced manufactures to use direct mapping of these caches. For example, a 32 GB direct mapped MCDRAM cache that supports 512 GB of main memory (e.g., DRAM) with a 64 B cache line size would require 2 Gbits (or 256 megabytes (MB)) of cache memory for the metadata array. Making this direct-mapped cache a four-way set-associative cache would add two more bits to the tags because the number of sets decreases by four, increasing the metadata array by fifty percent. A fifty percent increase in storage for the metadata array in cache memory will likely be unacceptable. Even making the direct-mapped cache a two-way set-associative cache would increase the metadata array by twenty-five percent. Accordingly, large caches have remained direct mapped. Direct-mapped caches, however, have quite high conflict rates, making them underperform for many applications.

Accordingly, in one embodiment, the present disclosure provides for a processor to, in certain circumstances, direct a cache controller to increase the number of ways of a cache to which cache entries are allocated. For example, instructing the cache controller to increase the number of ways may be in response to detecting less than a maximum allowable amount of the memory for a computing system, e.g., less than a maximum capacity of the memory. For example, if a customer does not populate main memory with the maximum allowed number of DRAM dual-in-line memory modules (DIMMs), or if a main application normally running on the computing system almost always requires less than all of the installed main memory, then the cache controller does not need as many bits to index the main memory, leaving additional bits to be employed as tag bits for set-associative cache. In this way, the processor may cause a cache reconfiguration from direct-mapped to set-associative cache, or from a two-way set-associative cache to a four-way set-associative cache, for example, or to any configuration that increases the number of ways of set-associative cache.

In one embodiment, the processor may detect the amount of memory during basic input/output system (BIOS) execution when the computing system is first booted, or in execution of an operating system after boot has occurred. In the case of the former, the processor may set one or more bits stored in a control register of the cache controller, to indicate to the cache controller to reconfigure the cache to increase the number of ways. In the case of the latter, the processor may first flush the cache, and then set the one or bits stored in the control register.

FIG. 1 is a block diagram of an example system architecture 100 that implements high bandwidth memory (HBM) as a memory-side cache (MSC) in a multi-channel memory system, according to an embodiment of the present disclosure. The multi-channel memory system, in one example, is multi-channel direct random access memory (MCDRAM) system, and in other embodiments includes different kinds of memory (listed below). The system architecture 100 may include a processor 105, a main memory 110 (or just "memory 110"), a device 120 (e.g., any integrated or connected hardware device), a cache 125, and an interconnect 115. The interconnect 115 may provide coupling between the processor 105 and the memory 110, the device 120, and the cache 125. The system architecture 100 may be part of a computing system.

The processor 105 may be any type of processor, including a general purpose microprocessor, such as a processor in the Intel® Pentium® Processor Family, Intel® Xeon® Processor Family, Intel® Core™ Processor Family, or other processor family from Intel® Corporation, or another processor from another company, or a special purpose processor or microcontroller. The processor 105 may include multiple threads and multiple execution cores 102A, 102B, . . . 102n, in any combination. Each processor core 102A, 102B, . . . 102n may include a corresponding level one (L1) cache 104A, 104B, . . . 104n, respectively, and a corresponding level two (L2) cache 106A, 106B, . . . 106n, respectively. In one example, the L1 and L2 caches are on-chip with the processor cores.

In one embodiment, the processor 105 is integrated in a single integrated circuit die having multiple hardware functional units (hereafter referred to as a multi-core system). The multi-core system may be a multi-core processor package, but may include other types of functional units than just processor cores. Functional hardware units may be processor cores, digital signal processors (DSP), image signal processors (ISP), graphics cores (also referred to as graphics units), voltage regulator (VR) phases, input/output (I/O) interfaces (e.g., serial links, DDR memory channels) and their controllers, network controllers, fabric controllers, or any combination thereof.

In one embodiment, the memory 110 may include one or more memory controllers 112 to control DRAM DIMMs 114 such as double data-rate (DDR) DRAM. Furthermore, the cache 125 may include one or more cache controllers 130 to control one or more high memory bandwidth (HBM) modules 132. In one example, each cache controller 130 is an MCDRAM cache controller and is coupled to the one or more memory controllers 112. While it should be understood there could be more than one cache controller, reference hereinafter is sometimes made to a single cache controller 132 for simplicity of discussion.

The memory 110, furthermore, may include any type of persistent or non-volatile media, such as a flash memory device, a solid-state device (SSD), a memristor, phase change memory (e.g., PCS, PCM, PCME, PCRAM, Ovonic Unified Memory, Chalcogenide RAM, C-RAM, etc.), or other storage or memory device. The memory 110 stores instructions and/or data represented by data signals that are to be interpreted and/or executed by the processor 105. The processor 105 may be coupled towards the memory 110 via the interconnect 115. In some embodiments, the memory 110 is a dual-inline memory module (DIMM). The memory 110 may also include volatile memory, such as in the form of random access memory (RAM) or registers.

The device 120 may be a device (e.g., an input-output (I/O) device), a driver belonging to an I/O device, or software program capable of accessing (e.g., reading from, writing to) the memory 110. When the device is a driver, the driver may be running on the processor 105 even though the driver belongs to an I/O device. An example of the device 120 may include a graphics device or graphics driver. The device 120 may receive or be assigned a memory address, multiple memory addresses, a block of memory address, or multiple blocks of memory addresses (hereafter referred to collectively as "an address"). For example, an operating system (not shown) may assign the device 120 an address to use during operation. Alternatively, the device 120 may arbitrarily select an address from a list of available memory addresses. The device 120 may also be integrated with the processor 105 as part of a system-on-a-chip (SoC).

The cache 125 is shown as a memory-side cache (MSC) of a multi-level cache, although the techniques described may be applied to differing levels of cache within one or more cores, a set of one or more shared cache units and the memory 110. The set of shared cache units may include, in addition to the L1 and L2 caches, additional mid-level caches, level 3 (L3), level 4 (L4), or other levels of cache, and/or combinations thereof. Any number of cache configurations and cache sizes are contemplated. Depending on the architecture, the cache 125 may be a single internal cache located on an integrated circuit or may be multiple levels of internal caches on the integrated circuit. For configurations with multiple cache levels, the caches can be configured to be inclusive or non-inclusive. Other embodiments include a combination of both internal and external caches depending on particular embodiments.

Caches may be configured in different schemes, generally referred to as direct mapped, fully associative, and set-associative. In some embodiments, the processor 105 may, whether during or after boot of a computing system containing the system architecture 100, direct the cache controller(s) 130 to reconfigure the cache 125 to increase the number of ways in which to allocate cache entries. After reconfiguration, if not before, the cache 125 will be a set-associative cache of some type. A set-associative cache includes one or more cache ways organized within cache sets into which the cache is divided. Visually, for example, the sets of ways may be viewed as rows and the ways may be viewed as columns organized across each of the rows. Each cache way, therefore, may include a metadata block that includes an address reference to actual data fetched from a main memory (e.g., a tag), and a data block (e.g., a cache line that contains data fetched from the main memory).

More specifically, set-associative cache is a hybrid between a fully associative cache and direct-mapped cache. Caches are generally divided into multiple equal sections called cache ways (or slots or blocks). A set-associative scheme works by grouping the cache sets into ways to create a set-associative scheme, where each numbered set corresponds to a set of main memory locations. For example, a main memory can have 1000 memory locations and may be divided into four ways. A first way of the main memory locations can include locations 1-250, a second way of the main memory locations may include locations 251-500, and so forth. By adding ways, set-associative cache is broken into more chunks of memory locations, and correspondingly reduces the chances of a cache conflict (also referred to as a collision) to a particular set and way.

A set-associative scheme is considered a reasonable compromise between power-hungry hardware needed for fully associative caches (which requires parallel searches of all ways) and the simplistic direct-mapped scheme, which may cause collisions of addresses stored to the same way (similar to collisions in a hash table). The fewer ways needed to be searched, the less hardware is required, but the greater chance of collision. Common choices, therefore, include 4-way or 8-way associative caches in which sets are groups of four or eight ways, respectively. So, in a cache with 128 ways and 8 ways per set, there are 16 sets, for example, which may be numbered 0 to 15. An individual way within the cache may be referenced by the set number and by the way within the set, for example "Set 14, Way 5."

The cache controller 130 may include a set of control registers 131, which the cache controller 130 may reference to determine a cache configuration, including a level of set-associative cache. The cache controller 130 may reconfigure its hardware for addressing the HBM modules 132 based on the cache configuration read from the control registers 131, as will be discussed in more detail with reference to FIGS. 5, 6, and 7A through 7D. In one embodiment, the processor 105 may reprogram the cache 125 during or after boot of a computing system by writing to the control registers 131. Accordingly, the processor 105 or other processing unit may be a means by which to which to update the values in the set of control registers 131. The processor 105 may perform this write to the control registers 131 in response to detecting that the DRAM DIMMs 114 (or other memory 110) present in the computing system add up to less than a total allowable amount of main memory of the computing system. In an alternative embodiment, the processor performs this write to the control registers 131 in response to detecting that a main application the processor is executing is taking up less than the total amount of available memory. During boot, the BIOS of the processor may perform detection of the amount of memory installed in the computing system. After boot, an operating system or other software may detect the amount of memory installed in the computing system.

Figure 2:
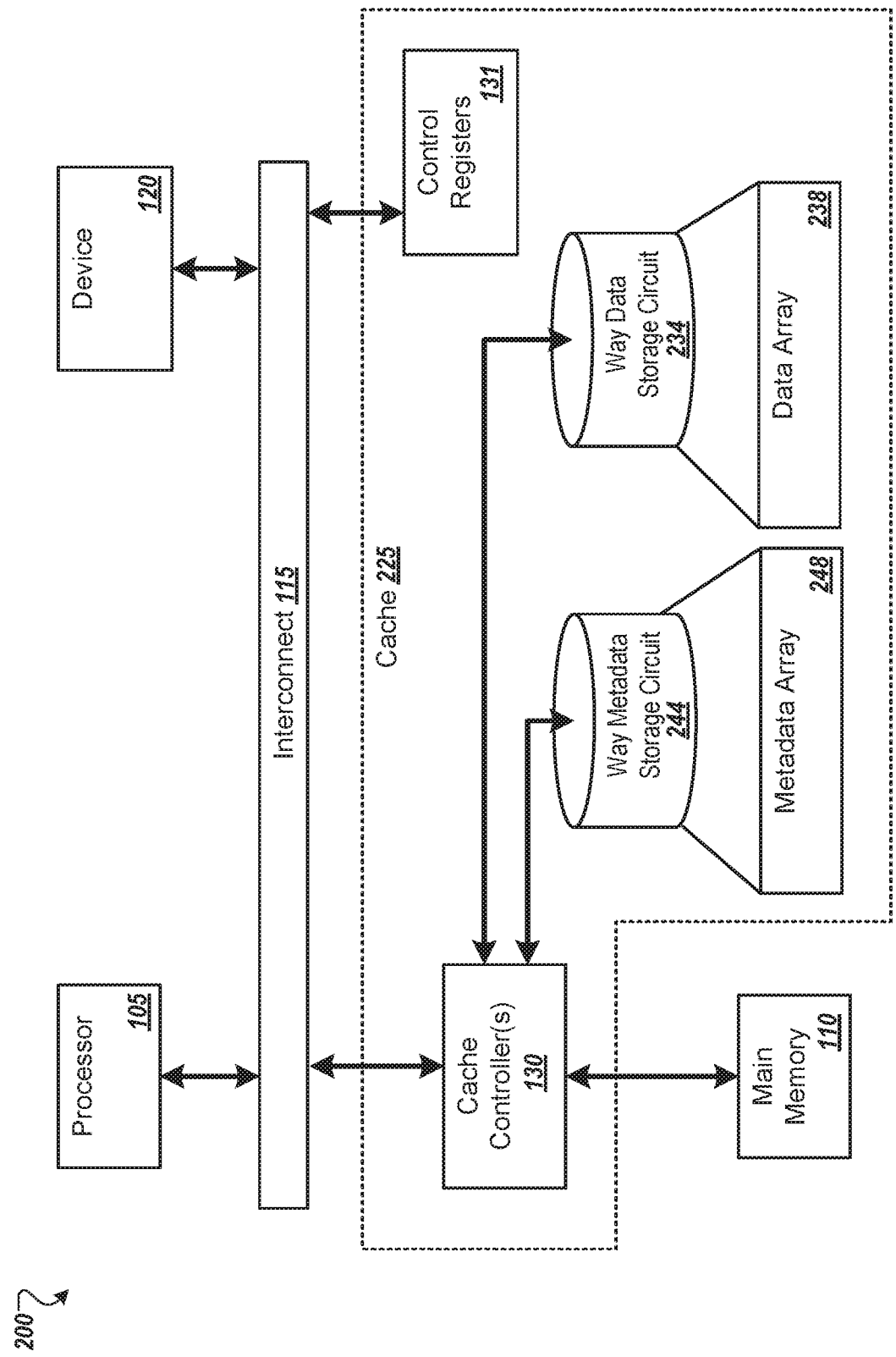
FIG. 2 is a detailed block diagram of the MSC of FIG. 1, according to an embodiment of the present disclosure.
Figure 3:
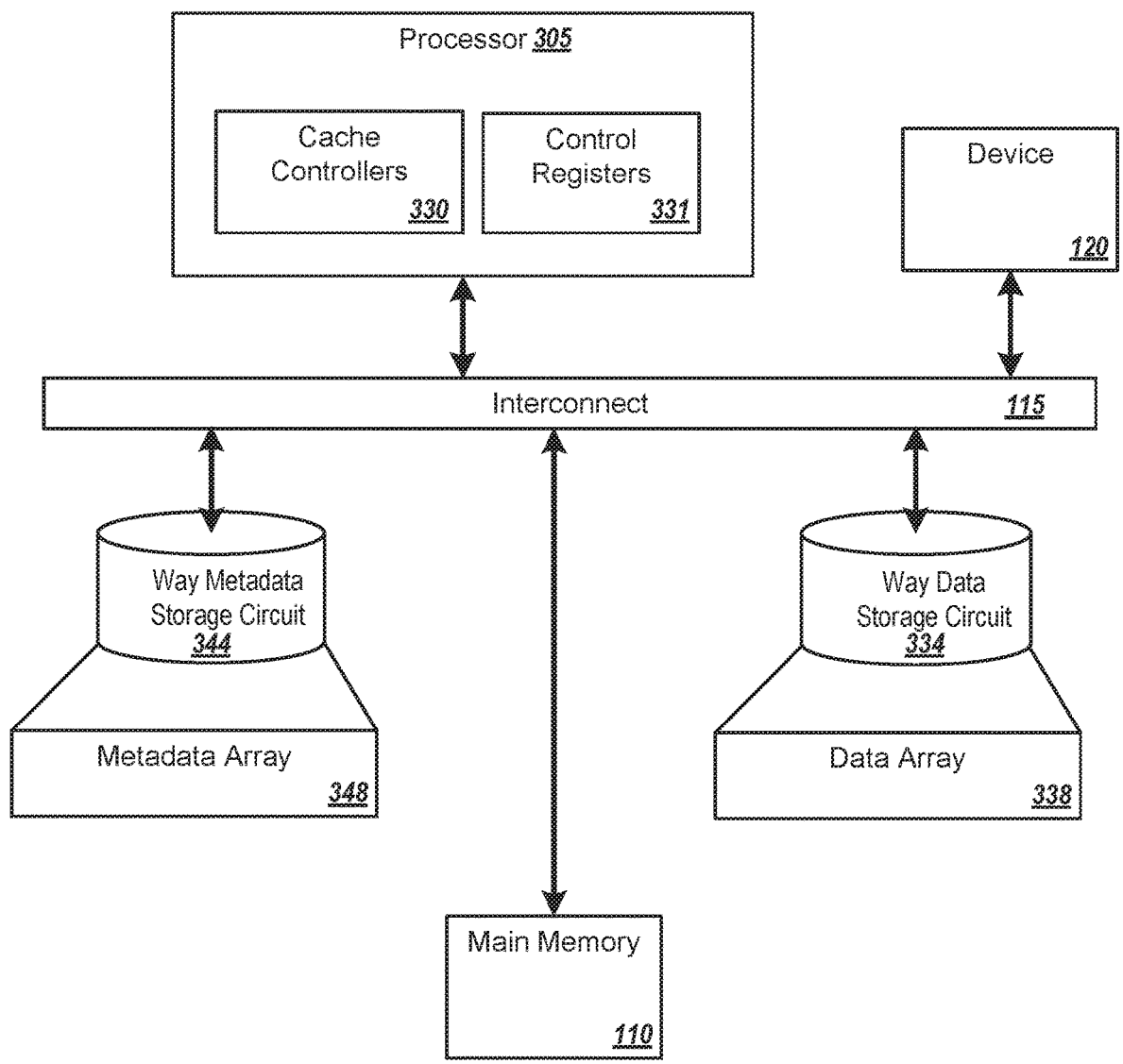
FIG. 3 is a block diagram of the MSC of FIG. 1, according to an additional embodiment of the present disclosure.
Figure 4:
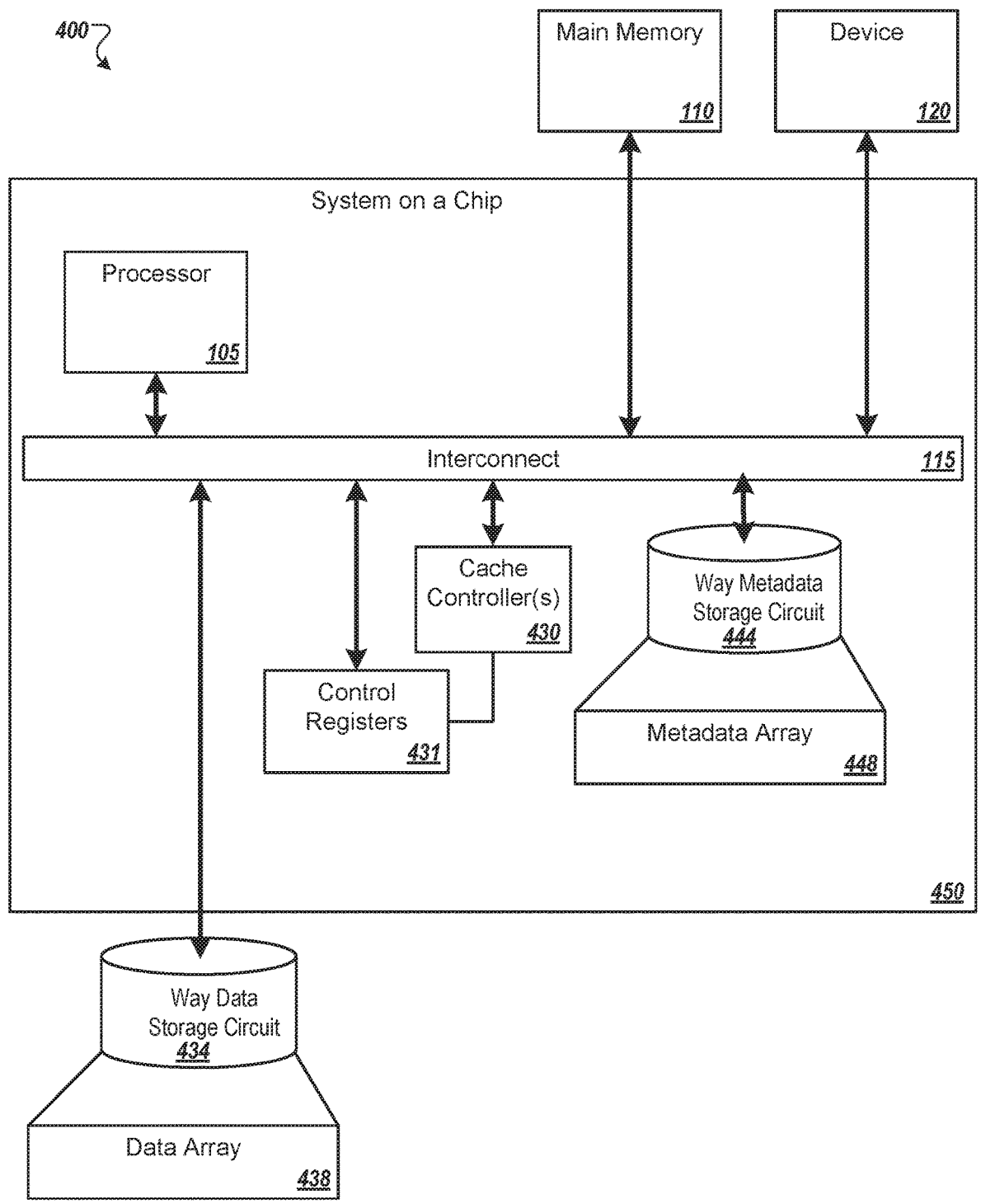
FIG. 4 is a block diagram of the MSC of FIG. 1, according to another embodiment of the present disclosure.

FIGS. 2, 3, and 4 illustrate three different embodiments of the architecture 100 in which the cache 125 is a memory-side cache (MSC). These three different embodiments are exemplary as there may be other embodiment of the system 100. Transactions from the processor 105 or the device 120 that are directed to the main memory 110 pass through the cache 125. In FIG. 2, a first system architecture 200 has a cache 225 that includes, in addition to the cache controller 130, a way data storage circuit 234 and a way metadata storage circuit 244. The way data storage circuit 234 may store a number of data arrays 238 in which data belonging to a series of ways of the same number (belonging to several sets) are grouped into respective pages of memory.

The way metadata storage circuit 244 may store additional information relating to the data stored in the ways within the way data storage circuit 234. This additional information may be formatted as a metadata array 248. Way metadata may include additional information relating to each way that may be used for deciding on way allocation, including a tag (which may be used to derive the address in main memory which is to be cached by that way), valid bits (which indicate that the way data storage circuit does indeed hold valid data associated with that address in main memory), and dirty bits (which indicate that the data in the way data storage circuit associated with that address in main memory has been modified since being read from main memory and will need to be copied back to main memory at some point). The valid bits and dirty bits may together be referred to herein as status bits for simplicity.

A number of memory pages may each hold metadata for all the ways belonging to a set (e.g., a set 0 through 15) of the way data storage circuit 234. This arrangement facilitates rapid delivery of the metadata to the cache controller 130 for the derived set, allowing an efficient search for a tag that matches the desired main-memory-reference. Typically, for each quantity of way data held in the way data storage circuit 234, a much smaller quantity of way metadata is held in the way metadata storage circuit 244.

Accordingly, the way metadata storage circuit 244 structure may be much smaller than the way data storage circuit 234 structure although, as discussed, manufacturers have employed direct-mapped cache schemes to keep the size of the way metadata storage circuit 244 to a reasonable size in large MCDRAM and HBM caches. The processor 105 may, therefore, write to the control registers 131 to reconfigure the cache 225 to increase the numbers of ways (within the data array 238) to which to allocate cache entries, as discussed with reference to FIG. 1. For example, the processor 105 may write to the control registers 131 to reconfigure the cache 225 when less than the amount of allowable memory is installed or when a main application being processed requires less than the amount of available memory (both generally referred to herein as opportunities for increase in the number ways of a cache). Another opportunity may be when a system is under-utilized, e.g., in a cloud environment. In such a case, the system may be utilizing only a fraction of the available memory, for example, where all the applications and the operating system together do not need much memory (or at least not all the available memory). How the cache controller 130 performs the reconfiguration will be discussed in more detail with reference to FIGS. 5, 6, and 7A through 7D.

FIG. 3 illustrates alternative system architecture 300, in which a number of cache controllers 330 may be shared agents of a processor 305, e.g., on the same die or chip as the processor 305. In one embodiment, the cache controllers 330 may be interleaved cache controllers 330 and control allocation of cache entries to a data array 338 of a way data storage circuit 334 across the interconnect 115. For example, the interleaved cache controllers 330 may access a metadata array 348 of a way metadata storage circuit 344, and the data array 338 of the way data storage circuit 334, in a similar way as discussed with reference to FIG. 2, except for the accessing being in accordance with interleaved cache controllers across multiple ways. Specifically, the interleaving may be arranged such that, for a stream of requests to sequential main-memory-referencing addresses, individual requests are directed to the cache controllers 330 such that each interleaved controller may provide access to a full way's size worth of data and then requests are sent to each next interleaved cache controller in turn.

In the system architecture 300 of FIG. 3, a set of control registers 331 may be stored on-die with the processor 305 and be coupled to the cache controllers 330. Accordingly, after detecting an opportunity to increase the numbers of ways in the data array 338, the processor may directly write to the control registers 331. Subsequently, one of the interleaved cache controllers 330 may quickly read the control registers 331 in being co-located on the processor 305. For example, while the way data storage circuit 334 and the way metadata storage circuit 344 may be located across the interconnect 115 from the processor 305, the reconfiguration of hardware of the cache controllers 330 (to increase the number of ways) may happen more quickly when co-located on the processor 305.

FIG. 4 illustrates alternative system architecture 400, employing a system on a chip (SoC) 450. The SoC 450 may be an integrated chip, which includes the processor 105 and interconnect 115 of FIG. 1. The SoC 750 may be specially designed to put the logic from the disclosed algorithms onto a single die, making the implementation thereof faster, reducing data transfer energy, and making the SoC 450 smaller and easier to assemble than individual components.

The SoC 450 may further include a group of cache controllers 430 (which also may be interleaved), a way metadata storage circuit 444 that stores a metadata array 448, and a set of control registers 431. In one embodiment, the cache controllers 430, the way metadata storage circuit 444, and the control registers 431 are coupled to each other through the interconnect 115. Furthermore, a way data storage circuit 434 for storing a data array 438 may optionally be stored off-chip of the SOC 450. In this way, access speeds to the way metadata storage circuit 444 may be increased by storing the way metadata storage circuit 444 in on-chip cache, e.g., a higher-level cache, flash memory, or the like. Furthermore, the speeds to write to the control register 431 may be increased by being co-located on-chip with the processor 105.

As illustrated, the memory 110, the device 120 (e.g., IO device), and the way data storage circuit 434 may also be operatively coupled to the SoC 450 via the interconnect 115, although optionally being located outside of the SoC. In some embodiments, at least one of the memory 110, device 120, and way data storage circuit 434 are also disposed on the SoC 450. Corresponding numbering across Figures in the present disclosure may correspond to similar or exact structure or components throughout the various views of the Figures.

Figure 5:
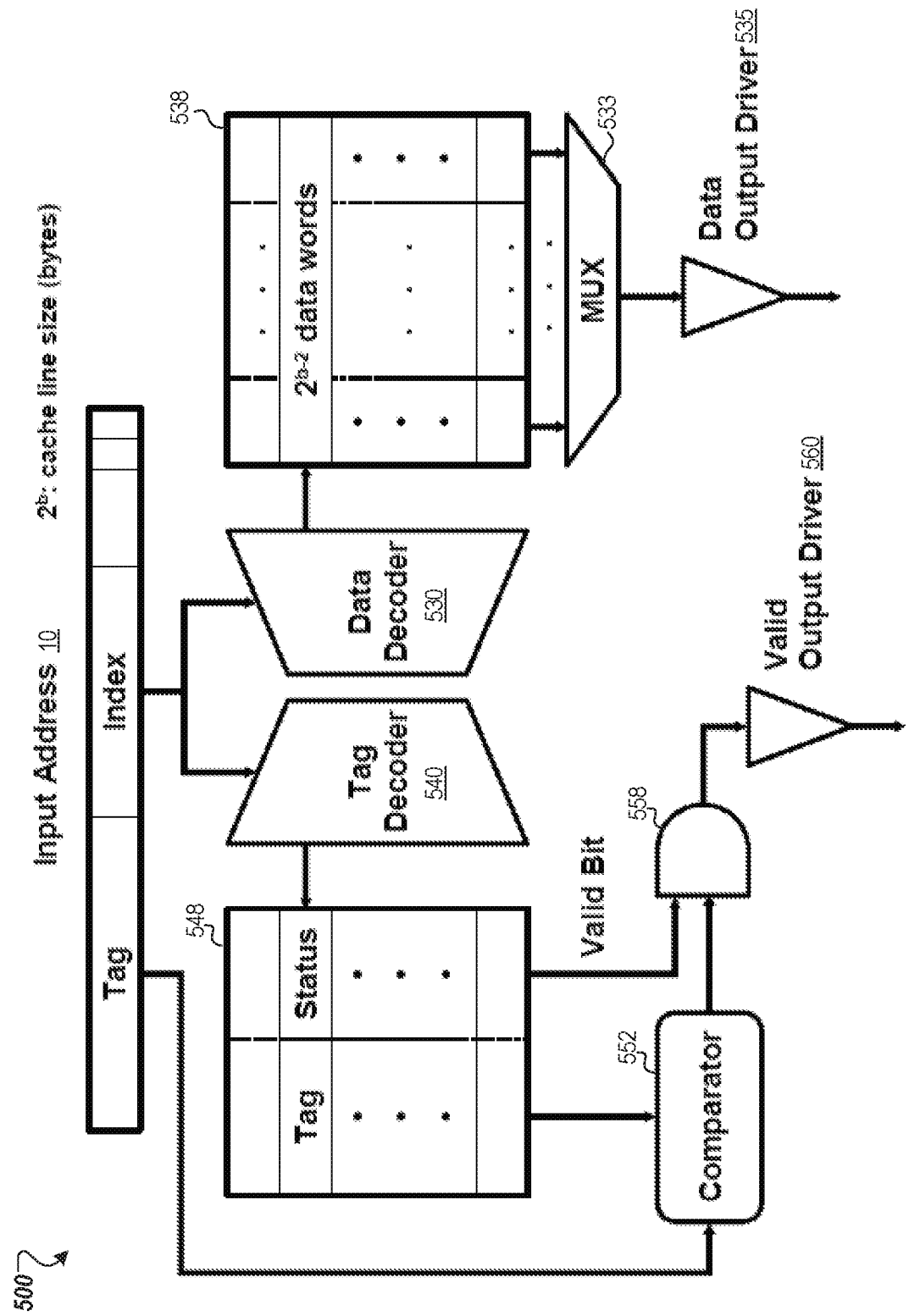
FIG. 5 is a block diagram of direct-mapped cache architecture according to an embodiment of the present disclosure.

FIG. 5 is a block diagram of direct-mapped cache architecture 500, according to one embodiment, which may be initially embodied within any of the cache controllers disclosed herein. The direct-mapped cache architecture 500 may include an input address 10 of a memory transaction, a data decoder 530, a data array 538 (stored in the way data storage circuit), a multiplexer 533, and a data output driver 535. The input address 10 may include, among other sections, an index portion and a tag portion, and is a main-memory referencing address. The direct-mapped cache architecture 500 may further include a tag decoder 540, a metadata array 548 (stored in metadata storage circuit), a comparator 552, an AND gate 558 (or other appropriate logic gate), and a valid output driver 560.

The tag decoder 540 may reference the index portion to determine an entry in the metadata array 548 corresponding to the index portion of the input address 10. The entry may include one or more tag bit and a status bit. The comparator 552 may then compare the tag portion of the input address with the one or more tag bit, and assuming the valid bit is asserted, the AND gate 558 may provide a valid output bit to the valid output driver 560, indicating that a copy of the data stored in main memory at the main-memory-referencing address supplied with the transaction is indeed held by the data array 538.

The data decoder 530, meanwhile, may reference the index portion of the input address 10 to determine a location within the data array 538 from which to retrieve the data of the memory transaction (for a read operation) or to which to store data of the memory transaction (for a write operation). In one embodiment, the data decoder may direct the multiplexer 533 to choose the correct entry in the data array 538, and pass the data to a data output driver 535, which data may be read in the case of the read operation.

Figure 6:
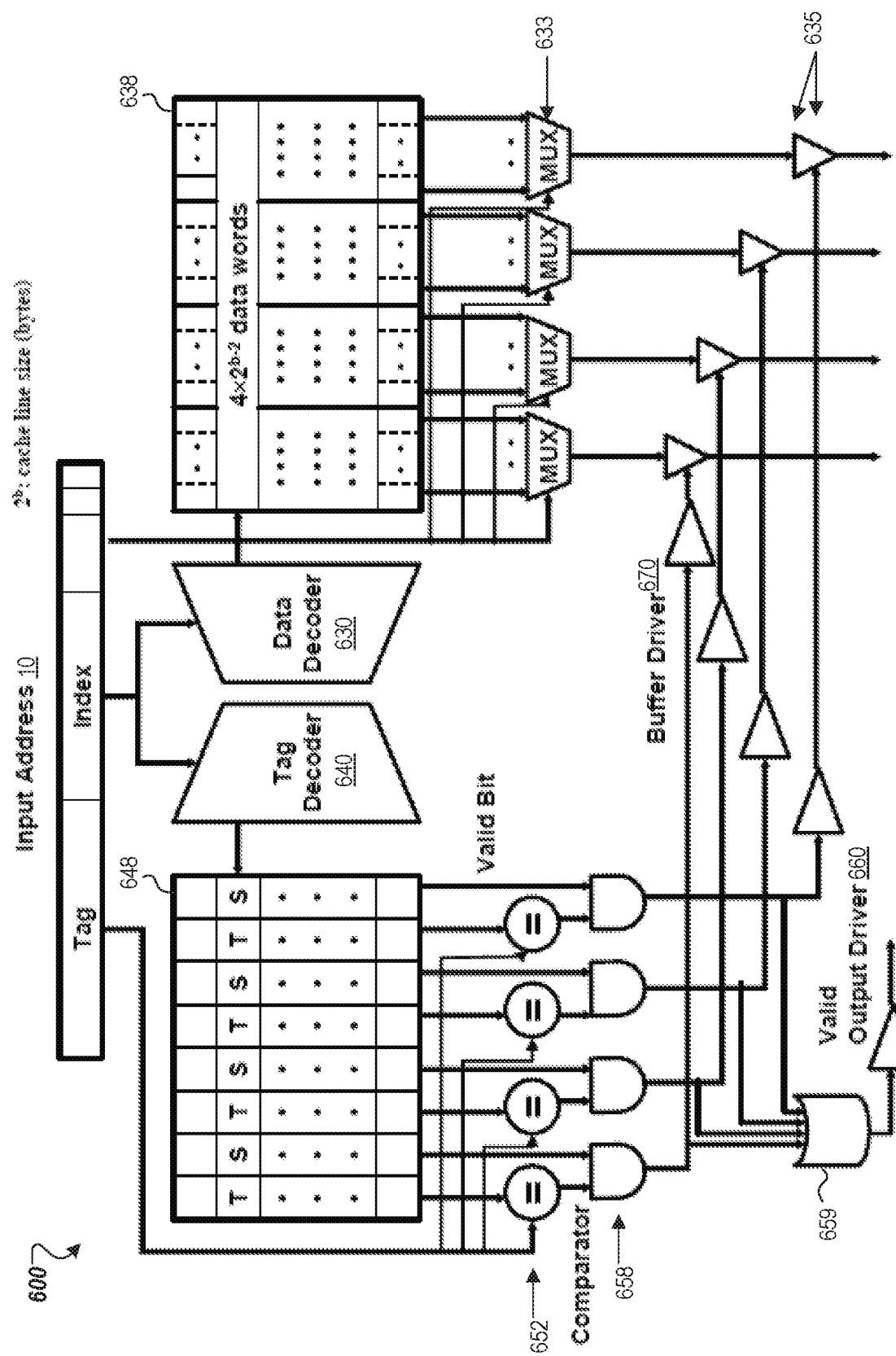
FIG. 6 is a block diagram of set-associative cache architecture according to an embodiment of the present disclosure.

FIG. 6 is a block diagram of set-associative cache architecture 600, according to one embodiment, which may be embodied in any of the cache controllers disclosed herein, and may serve as an example of set-associative cache architecture 600 after reconfiguring a cache controller to include additional ways. In the example of FIG. 6, the set-associative cache architecture 600 is a four-way set-associative cache architecture 600. The set-associative cache architecture 600 may include the input address 10 of a memory transaction, a data decoder 630, a data array 638 (stored in way data storage circuit), a set of multiplexers 633, and a set of data output drivers 635. The data decoder 630 may use the index portion of the input address 10 to find the proper row in the data array 638. Now, each row is a set that corresponds to four cache lines (one each for the four cache ways). A row in the data array 638 may hold four cache lines, each 32 bytes, for example.

Accordingly, the data array 638 now includes four ways of data ($4 \times 2^{b-2}$ data words), and so a cache controller 130, 330, or 430 that is increasing its number of ways from a direct-mapped cache architecture (FIG. 5) may add three additional multiplexers 633 and three additional data output drivers 635 coupled to way data storage circuit that stores the data array 638. The additional multiplexers and output drivers may already exist, but may be coupled to the way data storage circuit as illustrated upon reconfiguration to a four-way set-associative cache. To "couple to" may include activation of or connection to an existing input. Furthermore, the cache controller may also reconfigure the data decoder 632 to be able to access data within the data array 638 that is now indexed as four-way set-associative cache, e.g., matching an increase in the number of ways.

The set-associative cache architecture 600 may further include a tag decoder 640, a way metadata array 648, a set of tag comparators 652, a set of AND gates 658, an XOR gate 659, a valid output driver 660, and a set of buffer drivers 670. The tag decoder 640 may use the index portion of the input address 10 to find the proper row in the way metadata array 648. The row in the way metadata array 648 may contain four tags and status bits for those tags (2 bits per cache line). The tag memory and the data memory may be accessed in parallel, but the data output driver 635 is enabled when there is a cache hit.

Accordingly, the way metadata array 648 is sub-indexed corresponding to the four ways of the data array 638. In one embodiment, to provide corresponding logic for these four ways, three additional tag comparators 652 are added to the direct-mapped architecture 500 of FIG. 5, to bring the total number of tag comparators to four. The AND gates 658 are also increased to a total of four, and the XOR gate 659 is added to generate a valid output bit to the valid output driver 660 from four inputs coming from outputs of the four AND gates 658. Furthermore, the cache controller may add the buffer drivers 670 so that an asserted AND gate also powers on the data output driver 635 corresponding to the data selected by the data decoder 630. These additional tag comparators and logic gates may already exist, but may need to be coupled to metadata storage circuit (that holds the way metadata array 648) during reconfiguration to add ways to an existing cache. To "couple to" may include activation of connection to an existing input. In one embodiment, the cache controller also reconfigures the tag decoder 640 to be able to access the metadata array that is now indexed as a four-way set-associative cache, e.g., matching the increase in the number of ways.

With additional reference to FIGS. 2 and 6, consider the example where a read transaction is sent towards the main memory 110 from the processor 105 or the device 120. The cache controller 130 may first see the read transaction. The tag decoder 640 may then derive the set of cache ways applicable to the read transaction from the index portion of the input address 10 with the read transaction. The tag decoder 640 may access, from the metadata array 248 (of the way metadata storage circuit 244), the tag and status bit information pertaining to the ways of the derived set. The tag comparators 652 may compare the retrieved tag bit information to the tag bits of the input address 10, and use a corresponding status bit, to determine whether a copy of the data stored in main memory at the main-memory-referencing address supplied with the read transaction is indeed held by one of the ways of the derived set. This determination may indicate when an output of one of the AND gates 658 is asserted. If such a copy is held, the buffer driver 670 corresponding to the asserted AND gates 658 may also enable a corresponding data output driver 635 to extract the data of this copy, which is data the data decoder 630 finds held for the way within the set from the way data array 638.

Use of the four-way set-associative cache may allow the indexing of more unique set and way entries than is possible with the direct-mapped cache architecture, providing for fewer address conflicts. The reconfiguration of a cache from direct-mapped (FIG. 5) to four-way set associative (FIG. 6) has been provided as an example. As will be apparent to one skilled in the art, the increase in number of ways may be from direct-mapped to two-way set-associative, from two-way set-associative to four-way set-associative, from four-way set-associative to eight-way set-associative, or may be some other increase in the number of ways that requires reconfiguration of a cache.

FIG. 7A is a block diagram illustrating addressing of an original 32 GB direct-mapped cache that supports 512 GB capacity of DRAM, according to an embodiment of the present disclosure. Currently, the cache indexed as illustrated in FIG. 7A has 512M sets (32 GB divided by 64). If a processor or processor core were to make this cache a four-way set-associative cache, there would be only 128M sets, requiring support with six-bit tags (a fifty percent increase in tag array capacity). However, when only 128 GB of main memory (e.g., DRAM) is installed in the computing system, the cache may represent a tag with existing four tag bits, as shown in FIG. 7B. Use of only four bits to represent tags keeps the size of the metadata array smaller, while also leaving two unused tag bits that may be employed for use in least-recently used (LRU) tracking of the cache or for use in cyclic redundancy check (CRC) error detection and/or correction of the cache. This provides a flexibility to improve the functioning and reliability of the cache when extra metadata bits are available with which to operate the cache.

FIG. 7C is a block diagram illustrating reconfigured addressing of the 32 GB cache of FIG. 7A, which instead supports 256 GB of DRAM, as a two-way set-associative cache, according to an embodiment of the present disclosure. In this example, there are 256M sets, and so only one tag bit remains as unused after four tag bits are employed to represent tags. Again, this unused tag bit may be employed in LRU or CRC functionality.

FIG. 7D is a block diagram illustrating reconfigured addressing of the 32 GB cache of FIG. 7A, which instead supports 128 GB of DRAM, as a two-way set associative cache, according to an embodiment of the present disclosure. In this example, there are 128M sets to be indexed, leaving five bits for metadata. But, only three bits are needed to represent tags for the 128M sets, leaving two unused tag bits that may be employed in LRU or CRC functionality. The examples in FIGS. 7A through 7D are merely exemplary, and additional changes in cache addressing are envisioned that increase the number of ways of a cache, and that may also leave metadata bits for other functionality other than LRU or CRC, for example.

Figure 8:
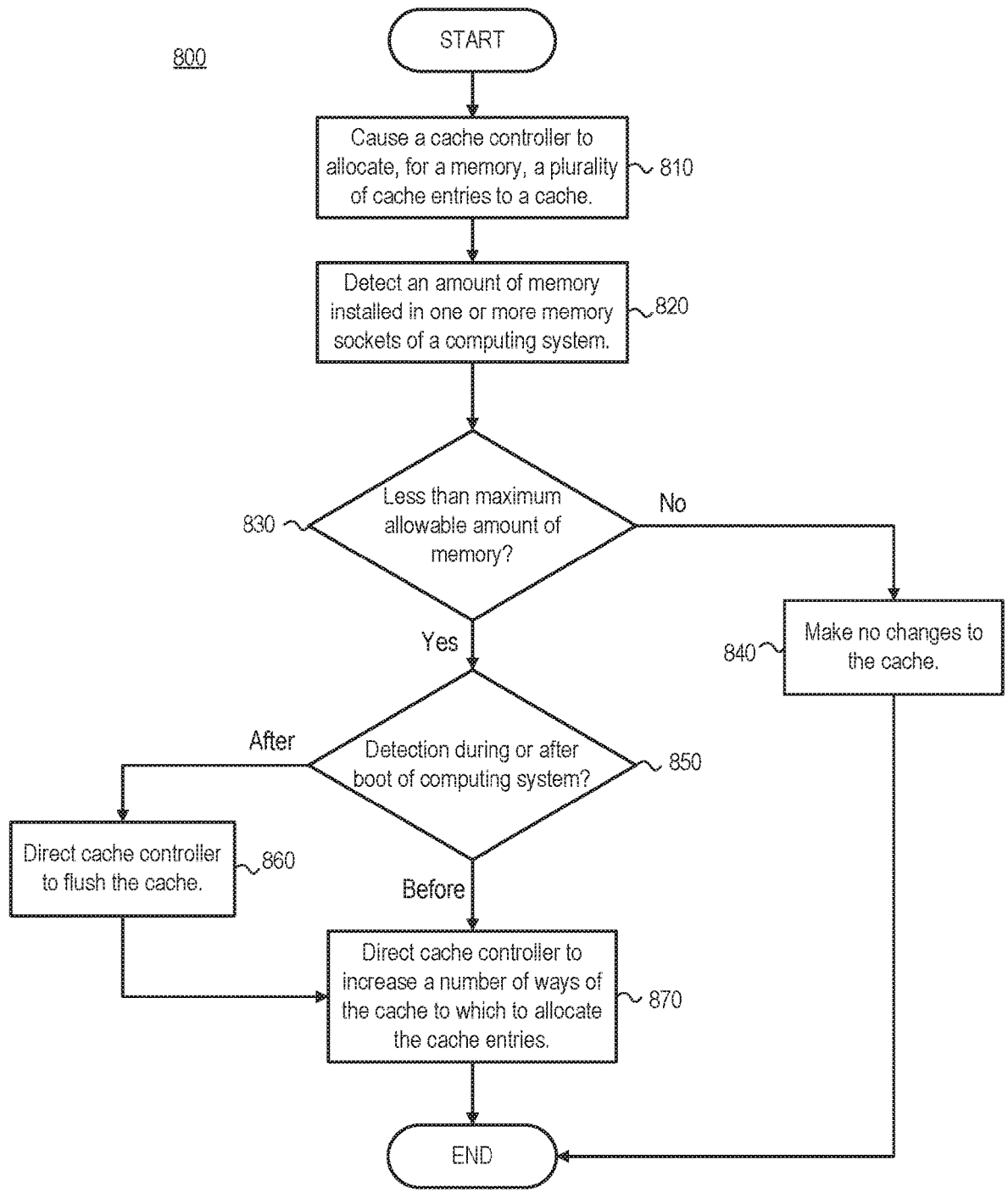
FIG. 8 is a flow chart of an exemplary method for increasing a number of ways to a memory-side cache, according to an embodiment of the present disclosure.

FIG. 8 is a flow chart of an exemplary method 800 for increasing a number of ways to a memory-side cache, according to an embodiment of the present disclosure. The method 800 may be performed by a system that may include hardware (e.g., circuitry, dedicated logic, and/or programmable logic), software (e.g., instructions executable on a computer system to perform hardware simulation), or a combination thereof. In an illustrative example, the method 800 may be performed by the any of the system architectures disclosed herein, including the system architectures 100, 200, 300, or 400, or a combination thereof.

More specifically, referring to FIG. 8, the method 800 may start with a multi-core processor or other processing unit ("processor") causing a cache controller to allocate, for a memory, a plurality of cache entries in a cache (810). The method 800 may continue with the processor detecting an amount of memory installed in a computing system (820), e.g., in one or more memory sockets of a computing system. (In an alternative embodiment, block 820 may be replaced with determining an amount of memory required for an application the processor is executing.) The method 800 may continue with the processor determining whether the computing system has installed less than the maximum allowable amount of memory (830). (In the alternative embodiment, the processor may determine that the amount of memory required is less than a maximum available amount of the memory for the computing system.)

If the answer is no, the method 800 may continue with making no changes to the cache configuration (840). If the answer is yes, the method 800 may continue with the processor further determining whether detecting the amount of installed memory happens during or after boot of the computing system (850). If after boot, the method 800 may continue with the processor flushing the cache of its contents (860). If before (or after the flush in block 860), the method 800 may continue with the processor directing the cache controller to increase a number of ways of the cache to which to allocate the cache entries (870). This direction may be by way of writing to control registers of the cache controller. The cache controller may then read the control registers to determine what level of set-associative cache to configure the cache for allocation of cache entries.

FIG. 9A is a block diagram illustrating a micro-architecture for a processor 900 that may reconfigure a memory-side cache with an increase in a number of ways, according to an embodiment of the present disclosure. Specifically, processor 900 depicts an in-order architecture core and a register renaming logic, out-of-order issue/execution logic to be included in a processor according to at least one embodiment of the disclosure. The embodiments of the page additions and content copying can be implemented in processor 900.

Processor 900 includes a front end unit 930 coupled to an execution engine unit 950, and both are coupled to a memory unit 970. The processor 900 may include a reduced instruction set computing (RISC) core, a complex instruction set computing (CISC) core, a very long instruction word (VLIW) core, or a hybrid or alternative core type. As yet another option, processor 900 may include a special-purpose core, such as, for example, a network or communication core, compression engine, graphics core, or the like. In one embodiment, processor 900 may be a multi-core processor or may be part of a multi-processor system.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 940 may be implemented using various different mechanisms. Examples of suitable mechanisms include, but are not limited to, look-up tables, hardware implementations, programmable logic arrays (PLAs), microcode read only memories (ROMs), etc. The instruction cache unit 934 is further coupled to the memory unit 970. The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations (RS), central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 958 is overlapped by the retirement unit 954 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which may include a data prefetcher 980, a data TLB unit 972, a data cache unit (DCU) 974, and a level 2 (L2) cache unit 976, to name a few examples. In some embodiments DCU 974 is also known as a first level data cache (L1 cache). The DCU 974 may handle multiple outstanding cache misses and continue to service incoming stores and loads. It also supports maintaining cache coherency. The data TLB unit 972 is a cache used to improve virtual address translation speed by mapping virtual and physical address spaces. In one exemplary embodiment, the memory access units 964 may include a load unit, a store address unit, and a store data unit, each of which is coupled to the data TLB unit 972 in the memory unit 970. The L2 cache unit 976 may be coupled to one or more other levels of cache and eventually to a main memory.

In one embodiment, the data prefetcher 980 speculatively loads/prefetches data to the DCU 974 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 900 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 9B is a block diagram illustrating an in-order pipeline 901 and a register renaming stage, out-of-order issue/execution pipeline 903 implemented by processor 900 of FIG. 9A according to some embodiments of the disclosure. The solid lined boxes in FIG. 9B illustrate an in-order pipeline 901, while the dashed lined boxes illustrates a register renaming, out-of-order issue/execution pipeline 903. In FIG. 9B, the pipelines 901 and 903 include a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 920, and a commit stage 922. In some embodiments, the ordering of stages 902-922 may be different than illustrated and are not limited to the specific ordering shown in FIG. 9B.

Figure 10:
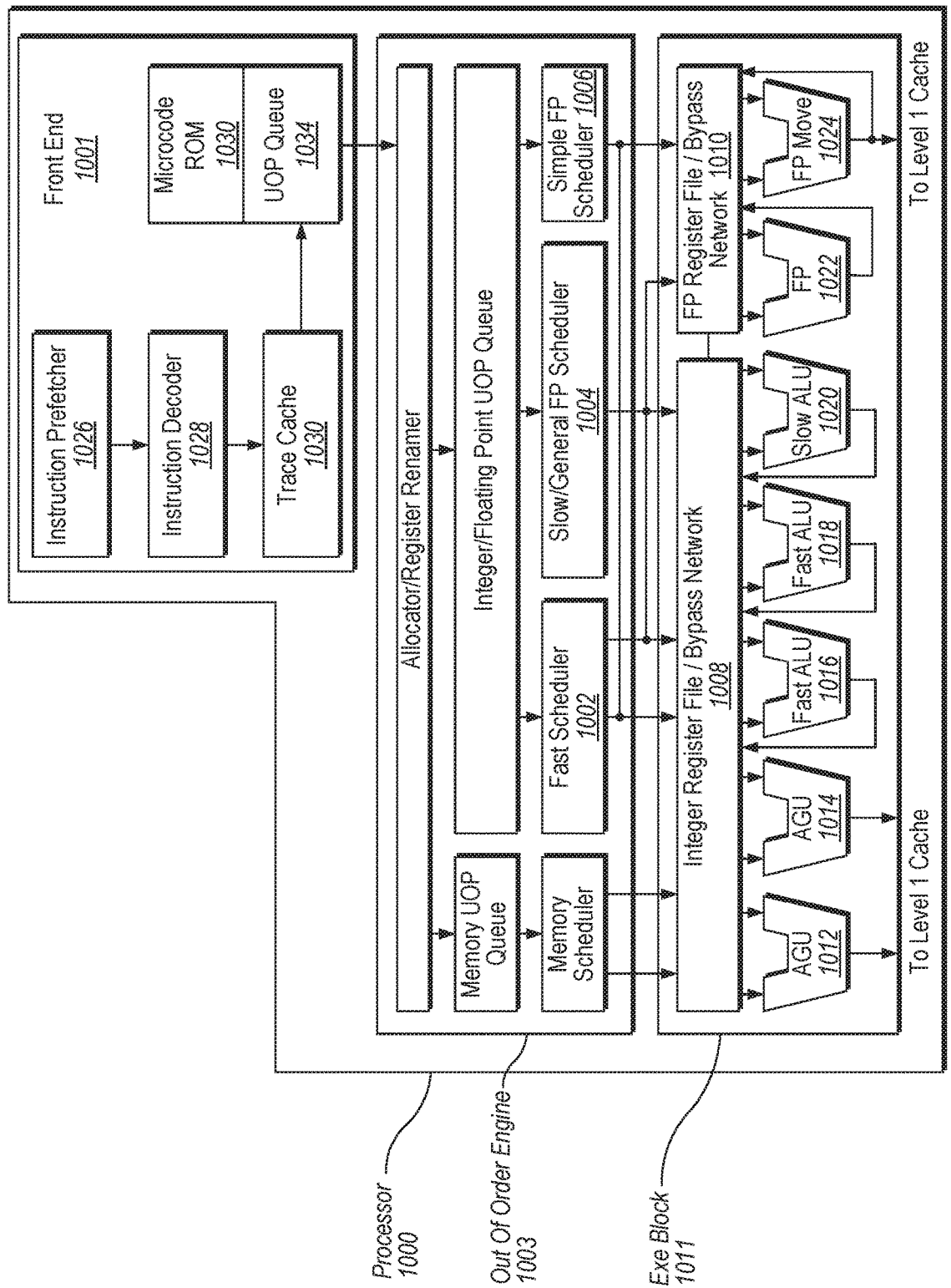
FIG. 10 illustrates a block diagram of the micro-architecture for a processor that includes logic circuits to reconfigure a memory-side cache with an increase in a number of ways, according to an embodiment of the present disclosure.

FIG. 10 illustrates a block diagram of the micro-architecture for a processor 1000 that includes logic circuits to reconfigure a memory-side cache with an increase in a number of ways, according to an embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1001 is the part of the processor 1000 that fetches instructions to be executed and prepares them to be used later in the processor pipeline. The embodiments of the page additions and content copying can be implemented in processor 1000.

The front end 1001 may include several units. In one embodiment, the instruction prefetcher 1016 fetches instructions from memory and feeds them to an instruction decoder 1018 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1030 takes decoded uops and assembles them into program ordered sequences or traces in the uop queue 1034 for execution. When the trace cache 1030 encounters a complex instruction, microcode ROM (or RAM) 1032 provides the uops needed to complete the operation.

Some instructions are converted into a single micro-op, whereas others need several micro-ops to complete the full operation. In one embodiment, if more than four micro-ops are needed to complete an instruction, the decoder 1018 accesses the microcode ROM 1032 to do the instruction. For one embodiment, an instruction can be decoded into a small number of micro ops for processing at the instruction decoder 1018. In another embodiment, an instruction can be stored within the microcode ROM 1032 should a number of micro-ops be needed to accomplish the operation. The trace cache 1030 refers to an entry point programmable logic array (PLA) to determine a correct micro-instruction pointer for reading the micro-code sequences to complete one or more instructions in accordance with one embodiment from the micro-code ROM 1032. After the microcode ROM 1032 finishes sequencing micro-ops for an instruction, the front end 1001 of the machine resumes fetching micro-ops from the trace cache 1030.

The out-of-order execution engine 1003 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1002, slow/general floating point scheduler 1004, and simple floating point scheduler 1006. The uop schedulers 1002, 1004, 1006, determine when a uop is ready to execute based on the readiness of their dependent input register operand sources and the availability of the execution resources the uops need to complete their operation. The fast scheduler 1002 of one embodiment can schedule on each half of the main clock cycle while the other schedulers can only schedule once per main processor clock cycle. The schedulers arbitrate for the dispatch ports to schedule uops for execution.

Register files 1008, 1010, sit between the schedulers 1002, 1004, 1006, and the execution units 1012, 1014, 1016, 1018, 1020, 1022, 1024 in the execution block 1011. There is a separate register file 1008, 1010, for integer and floating point operations, respectively. Each register file 1008, 1010, of one embodiment also includes a bypass network that can bypass or forward just completed results that have not yet been written into the register file to new dependent uops. The integer register file 1008 and the floating point register file 1010 are also capable of communicating data with the other. For one embodiment, the integer register file 1008 is split into two separate register files, one register file for the low order 32 bits of data and a second register file for the high order 32 bits of data. The floating point register file 1010 of one embodiment has 128 bit wide entries because floating point instructions typically have operands from 64 to 128 bits in width.

The execution block 1011 contains the execution units 1012, 1014, 1016, 1018, 1020, 1022, 1024, where the instructions are actually executed. This section includes the register files 1008, 1010, that store the integer and floating point data operand values that the micro-instructions need to execute. The processor 1000 of one embodiment is comprised of a number of execution units: address generation unit (AGU) 1012, AGU 1014, fast ALU 1016, fast ALU 1018, slow ALU 1010, floating point ALU 1012, floating point move unit 1014. For one embodiment, the floating point execution blocks 1012, 1014, execute floating point, MMX, SIMD, and SSE, or other operations. The floating point ALU 1012 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1016, 1018. The fast ALUs 1016, 1018, of one embodiment can execute fast operations with an effective latency of half a clock cycle. For one embodiment, most complex integer operations go to the slow ALU 1020 as the slow ALU 1020 includes integer execution hardware for long latency type of operations, such as a multiplier, shifts, flag logic, and branch processing. Memory load/store operations are executed by the AGUs 1022, 1024. For one embodiment, the integer ALUs 1016, 1018, 1020, are described in the context of performing integer operations on 64 bit data operands. In alternative embodiments, the ALUs 1016, 1018, 1020, can be implemented to support a variety of data bits including 16, 32, 128, 256, etc. Similarly, the floating point units 1022, 1024, can be implemented to support a range of operands having bits of various widths. For one embodiment, the floating point units 1022, 1024, can operate on 128 bits wide packed data operands in conjunction with SIMD and multimedia instructions.

In one embodiment, the uops schedulers 1002, 1004, 1006, dispatch dependent operations before the parent load has finished executing. As uops are speculatively scheduled and executed in processor 1000, the processor 1000 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 1000 also includes logic circuits to reconfigure a memory-side cache with an increase in a number of ways, according to an embodiment of the present disclosure. In one embodiment, the processor 1000 may include cache 125 that may respond to direction of the processor 1000, and reconfigure itself according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 11:
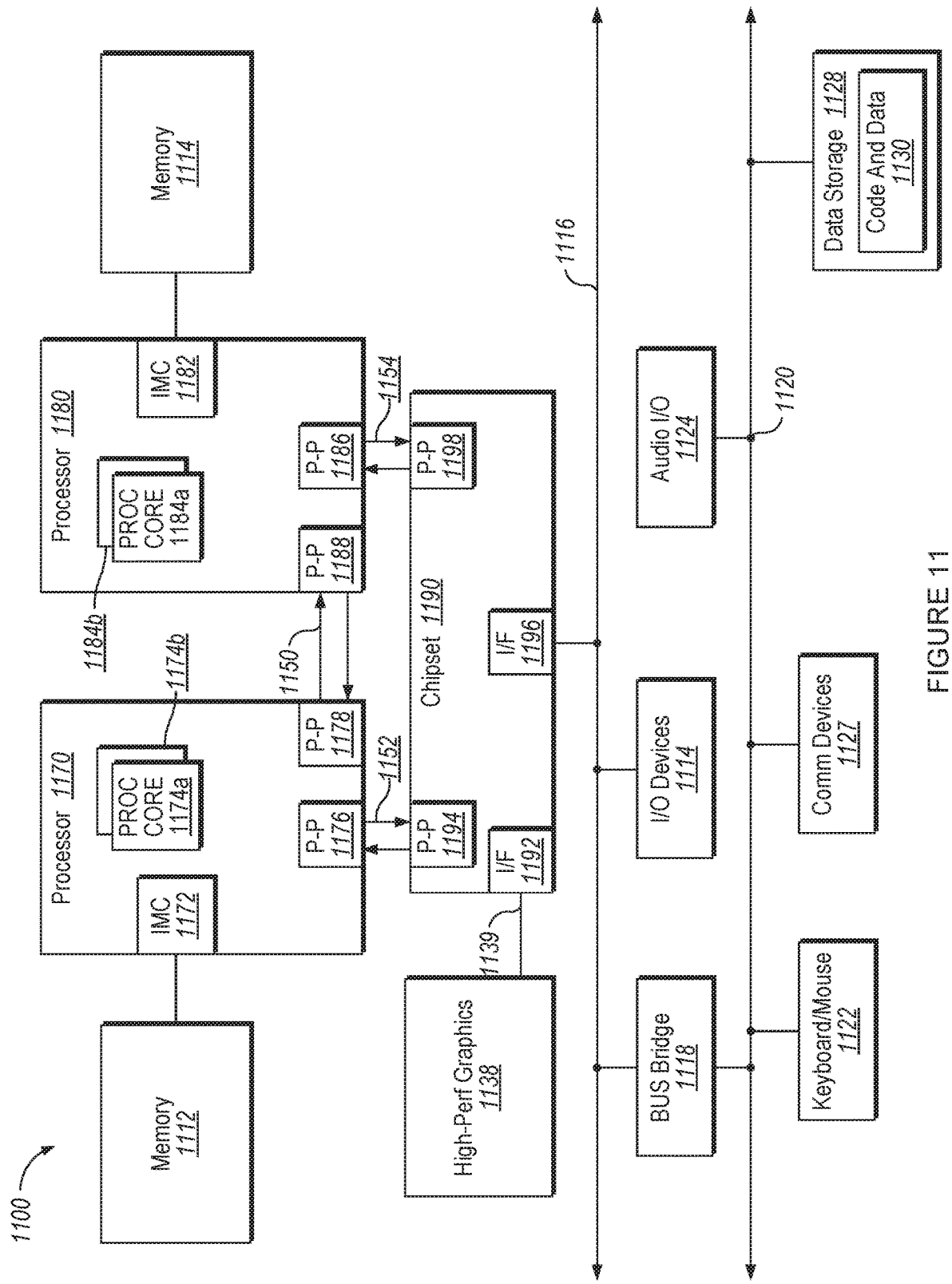
FIG. 11 is a block diagram of a computer system according to one implementation.

Embodiments may be implemented in many different system types. Referring now to FIG. 11, shown is a block diagram of a multiprocessor system 1100 in accordance with an implementation. As shown in FIG. 11, multiprocessor system 1100 is a point-to-point interconnect system, and includes a first processor 1170 and a second processor 1180 coupled via a point-to-point interconnect 1150. As shown in FIG. 11, each of processors 1170 and 1180 may be multicore processors, including first and second processor cores (i.e., processor cores 1174*a* and 1174*b* and processor cores 1184*a* and 1184*b*), although potentially many more cores may be present in the processors.

While shown with two processors 1170, 1180, it is to be understood that the scope of the present disclosure is not so limited. In other implementations, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1188; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors. The cache 125 of FIG. 1 may be integrated into the IMC 1172 and/or the IMC 1182 as memory-side cache, which may be reconfigured to increase a number of ways according to another embodiment of the present disclosure.

Processors 1170, 1180 may each exchange information with a chipset 1190 via individual P-P interfaces 1152, 1154 using point to point interface circuits 1176, 1194, 1186, 1198. Chipset 1190 may also exchange information with a high-performance graphics circuit 1138 via a high-performance graphics interface 1139.

A shared cache (not shown) may be included in either processor or outside of both processors, yet connected with the processors via P-P interconnect, such that either or both processors' local cache information may be stored in the shared cache if a processor is placed into a low power mode. Reconfigurations of a cache to include additional ways may also be employed in the shared cache across one or more cache controllers when allocating entries to the shared cache.

Chipset 1190 may be coupled to a first bus 1116 via an interface 1196. In one embodiment, first bus 1116 may be a Peripheral Component Interconnect (PCI) bus, or a bus such as a PCI Express bus or interconnect bus, although the scope of the present disclosure is not so limited.

Figure 12:
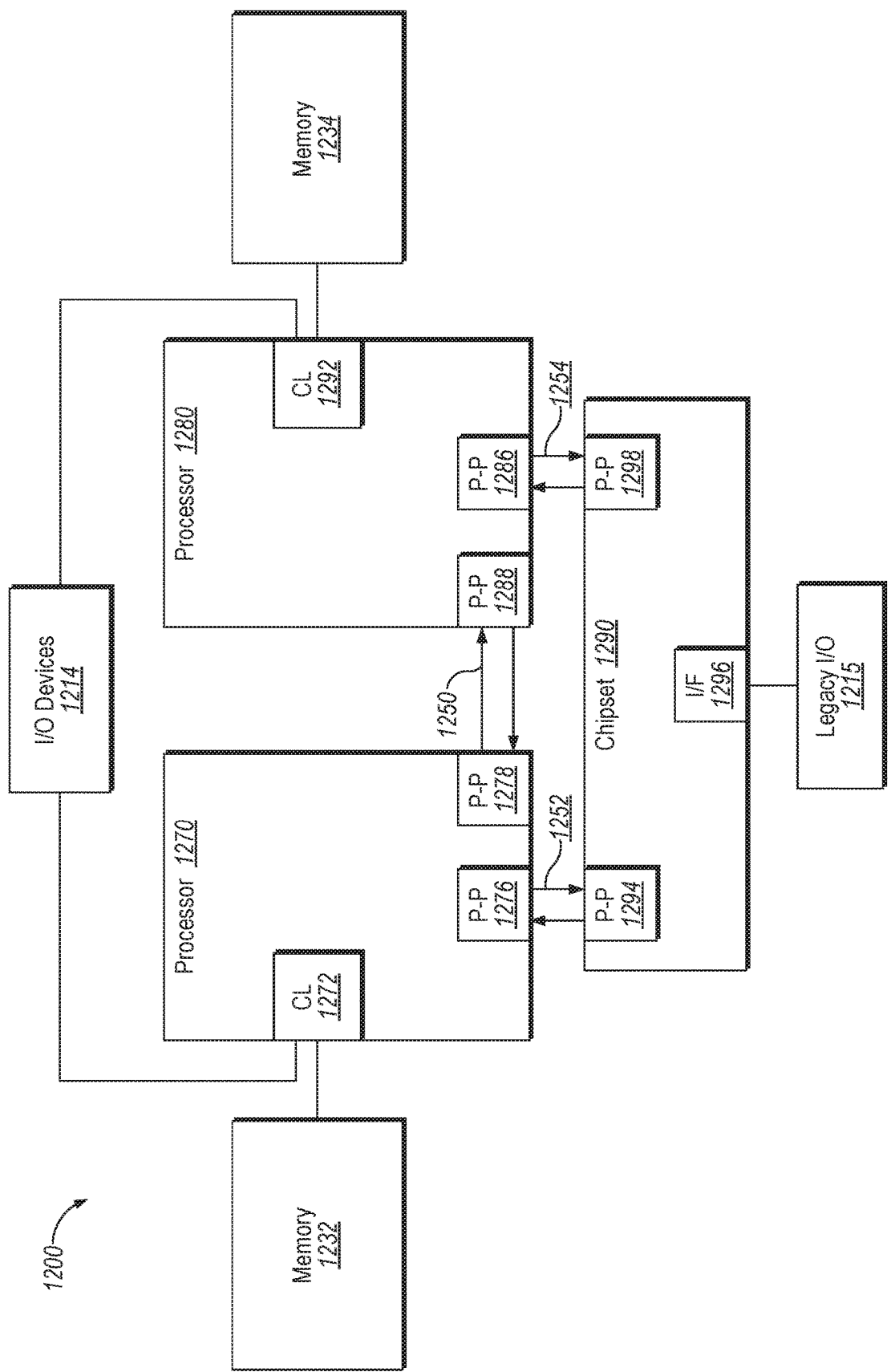
FIG. 12 is a block diagram of a computer system according to another implementation.

Referring now to FIG. 12, shown is a block diagram of a third system 1100 in accordance with an embodiment of the present disclosure. Like elements in FIGS. 11 and 12 bear like reference numerals, and certain aspects of FIG. 12 have been omitted from FIG. 11 in order to avoid obscuring other aspects of FIG. 12.

FIG. 12 illustrates that the processors 1270, 1280 may include integrated memory and I/O control logic ("CL") 1272 and 1292, respectively. For at least one embodiment, the CL 1272, 1282 may include integrated memory controller units such as described herein. In addition, CL 1272, 1292 may also include I/O control logic. FIG. 12 illustrates that the memories 1232, 1234 are coupled to the CL 1272, 1292, and that I/O devices 1214 are also coupled to the control logic 1272, 1292. Legacy I/O devices 1215 are coupled to the chipset 1290. The cache 125 of FIG. 1 may be integrated into the CL 1272 and/or the CL 1292 as memory-side cache, in which to reconfigure the memory-side cache to include additional ways according to another embodiment of the present disclosure.

Figure 13:
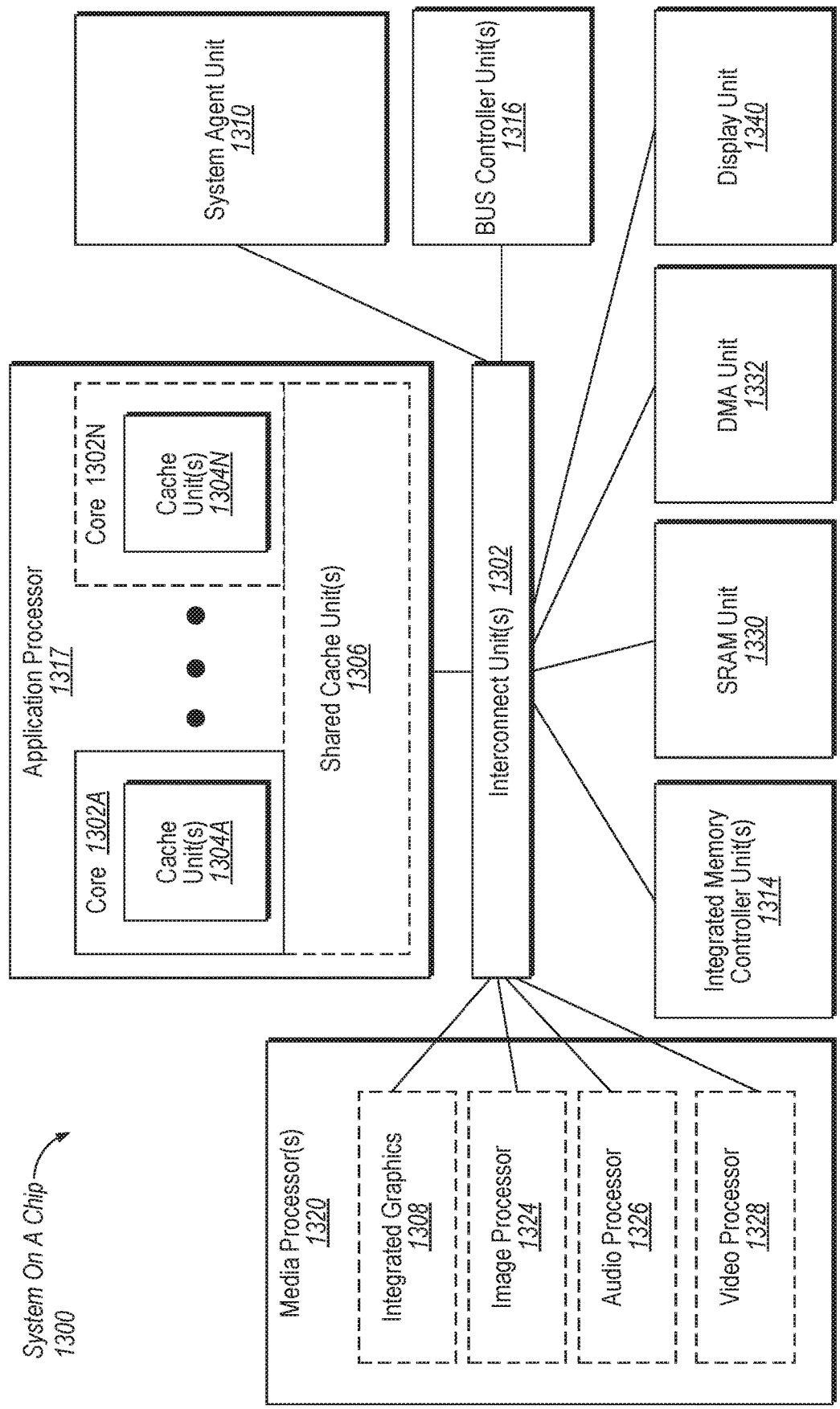
FIG. 13 is a block diagram of a system-on-a-chip according to one implementation.

FIG. 13 is an exemplary system on a chip (SoC) 1300 that may include one or more of the cores 1302. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1300 of FIG. 13, dashed lined boxes are features on more advanced SoCs. An interconnect unit(s) 1302 may be coupled to: an application processor 1317 which includes a set of one or more cores 1302A-N and shared cache unit(s) 1306; a system agent unit 1310; a bus controller unit(s) 1316; an integrated memory controller unit(s) 1314; a set or one or more media processors 1320 which may include integrated graphics logic 1308, an image processor 1324 for providing still and/or video camera functionality, an audio processor 1326 for providing hardware audio acceleration, and a video processor 1328 for providing video encode/decode acceleration; a static random access memory (SRAM) unit 1330; a direct memory access (DMA) unit 1332; and a display unit 1340 for coupling to one or more external displays.

Figure 14:
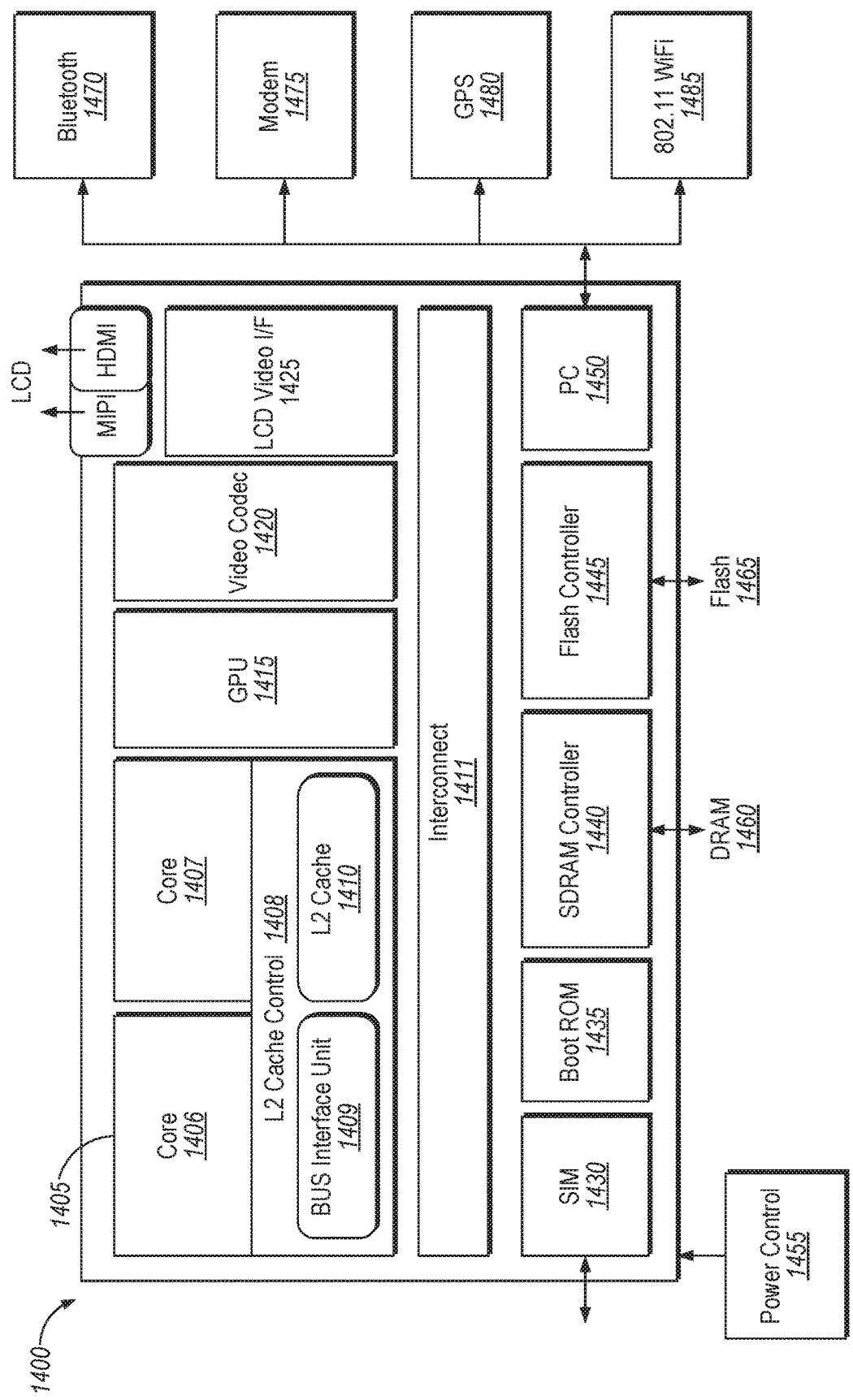
FIG. 14 illustrates another implementation of a block diagram for a computing system, according to an embodiment of the present disclosure.

Turning next to FIG. 14, an embodiment of a system on-chip (SoC) design in accordance with embodiments of the disclosure is depicted. As an illustrative example, SoC 1400 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1400.

Here, SoC 1400 includes 2 cores—1406 and 1407. Similar to the discussion above, cores 1406 and 1407 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1406 and 1407 are coupled to cache control 1408 that is associated with bus interface unit 1409 and L2 cache 1410 to communicate with other parts of system 1400. Interconnect 1411 includes an on-chip interconnect, such as an IOSF, AMBA, or other interconnects discussed above, which can implement one or more aspects of the described disclosure.

In one embodiment, SDRAM controller 1440 may connect to interconnect 1411 via cache 125. Interconnect 1411 provides communication channels to the other components, such as a Subscriber Identity Module (SIM) 1430 to interface with a SIM card, a boot ROM 1435 to hold boot code for execution by cores 1406 and 1407 to initialize and boot SoC 1400, a SDRAM controller 1440 to interface with external memory (e.g. DRAM 1460), a flash controller 1445 to interface with non-volatile memory (e.g. Flash 1465), a peripheral control 1450 (e.g. Serial Peripheral Interface) to interface with peripherals, video codecs 1420 and Video interface 1425 to display and receive input (e.g. touch enabled input), GPU 1415 to perform graphics related computations, etc. Any of these interfaces may incorporate aspects of the embodiments described herein.

In addition, the system illustrates peripherals for communication, such as a Bluetooth module 1470, 3G modem 1475, GPS 1480, and Wi-Fi 1485. Note as stated above, a UE includes a radio for communication. As a result, these peripheral communication modules may not all be included. However, in a UE some form of a radio for external communication should be included.

Figure 15:
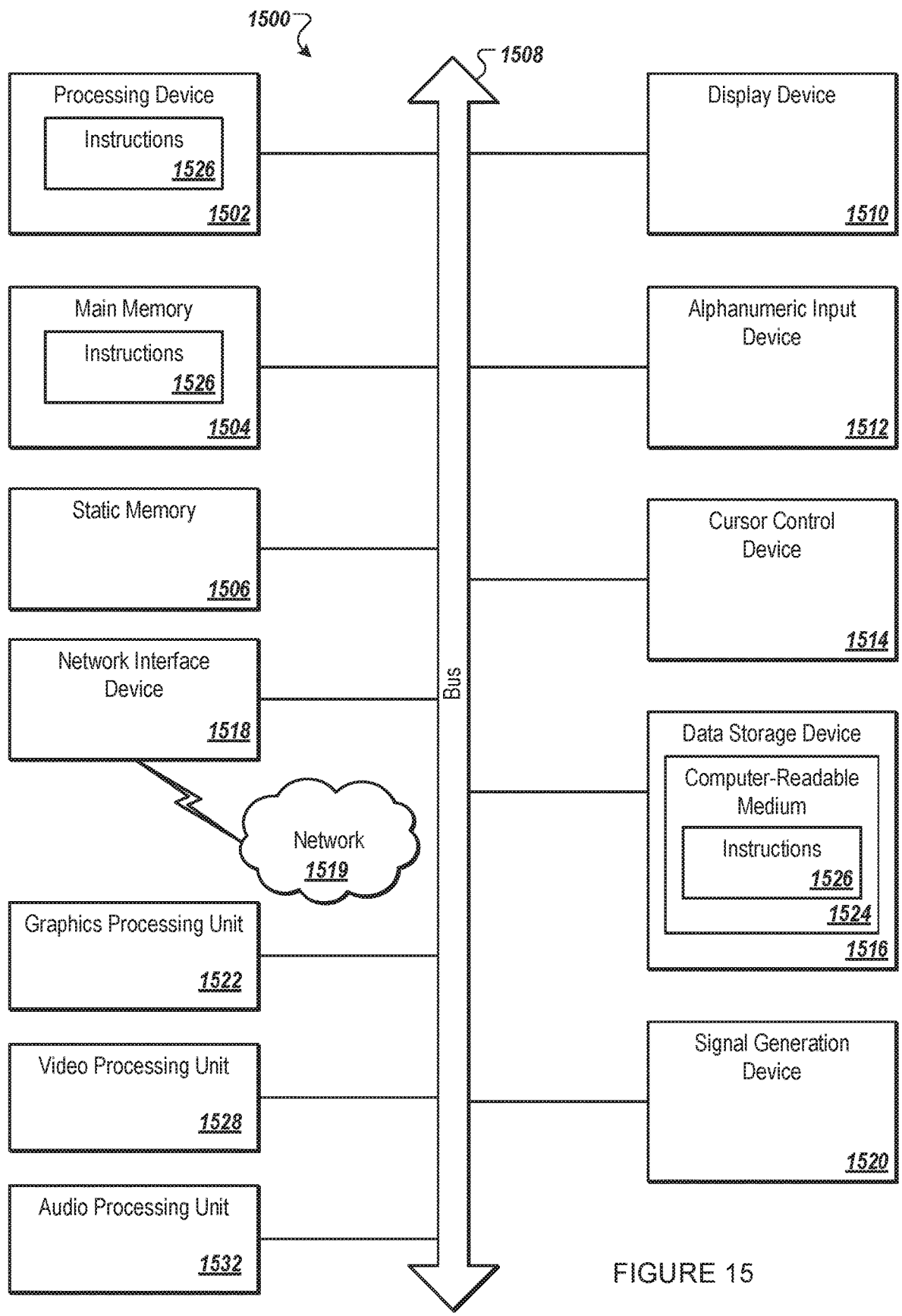
FIG. 15 illustrates another implementation of a block diagram for a computing system, according to an embodiment of the present disclosure.

FIG. 15 illustrates a diagrammatic representation of a machine in the example form of a computing system 1500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1500.

The computing system 1500 includes a processing device 1502, main memory 1504 (e.g., flash memory, dynamic random access memory (DRAM) (such as synchronous DRAM (SDRAM) or DRAM (RDRAM), etc.), a static memory 1506 (e.g., flash memory, static random access memory (SRAM), etc.), and a data storage device 1518, which communicate with each other via a bus 1508.

Processing device 1502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. In one embodiment, processing device 1502 may include one or processor cores. The processing device 1502 is configured to execute the processing logic 1526 for performing the operations discussed herein.

In one embodiment, processing device 1502 can be part of the computing system architecture 100 of FIG. 1. Alternatively, the computing system 1500 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1500 may further include a network interface device 1518 communicably coupled to a network 1519. The computing system 1500 also may include a video display device 1510 (e.g., a liquid crystal display (LCD) or a cathode ray tube (CRT)), an alphanumeric input device 1510 (e.g., a keyboard), a cursor control device 1514 (e.g., a mouse), a signal generation device 1520 (e.g., a speaker), or other peripheral devices. Furthermore, computing system 1500 may include a graphics processing unit 1522, a video processing unit 1528 and an audio processing unit 1532. In another embodiment, the computing system 1500 may include a chipset (not illustrated), which refers to a group of integrated circuits, or chips, that are designed to work with the processing device 1502 and controls communications between the processing device 1502 and external devices. For example, the chipset may be a set of chips on a motherboard that links the processing device 1502 to very high-speed devices, such as main memory 1504 and graphic controllers, as well as linking the processing device 1502 to lower-speed peripheral buses of peripherals, such as USB, PCI or ISA buses.

The data storage device 1518 may include a computer-readable storage medium 1524 on which is stored software 1526 embodying any one or more of the methodologies of functions described herein. The software 1526 may also reside, completely or at least partially, within the main memory 1504 as instructions 1526 and/or within the processing device 1502 as processing logic during execution thereof by the computing system 1500; the main memory 1504 and the processing device 1502 also constituting computer-readable storage media.

The computer-readable storage medium 1524 may also be used to store instructions 1526 utilizing the processing device 1502, such as described with respect to FIGS. 1, 4, 7A and 7B, and/or a software library containing methods that call the above applications. While the computer-readable storage medium 1524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 a processor comprising: 1) a processor core; and 2) a cache controller coupled to the processor core, the cache controller to allocate, for a memory, a plurality of cache entries in a cache; and wherein the processor core is to: a) detect an amount of the memory installed in a computing system; and b) responsive to detecting less than a maximum allowable amount of the memory for the computing system, direct the cache controller to increase a number of ways of the cache in which to allocate the plurality of cache entries.

In Example 2, the processor of Example 1, wherein the cache is a multi-channel dynamic random-access memory (MCDRAM) memory-side cache and the cache controller is a high bandwidth cache controller.

In Example 3, the processor of Example 1, wherein to increase the number ways, the cache controller is to update memory allocation to the cache from direct-mapped to set-associative.

In Example 4, the processor of Example 1, wherein to increase the number of ways, the cache controller is to update memory allocation to the cache from two-way set-associative to four-way set-associative.

In Example 5, the processor of Example 1, wherein the processor core is to further: a) detect, after boot of the computing system, the amount of the memory installed; and b) direct the cache controller to flush the cache before directing the cache controller to increase the number of ways of the cache.

In Example 6, the processor of Example 1, wherein the cache comprises a metadata storage coupled to the cache controller, the metadata storage to store a metadata array, wherein to increase the number of ways, the cache controller is to couple one or more additional tag comparators to the metadata storage, resulting in a number of tag comparators corresponding to the number of ways.

In Example 7, the processor of Example 6, wherein the cache controller comprises a tag decoder coupled to the metadata storage, wherein to increase the number of ways, the cache controller is further to reconfigure the tag decoder to access the metadata array according to a plurality of sets of ways matching the increase in the number of ways.

In Example 8, the processor of Example 1, wherein the cache further comprises a data storage coupled to the cache controller, wherein the cache controller comprises a data decoder coupled to the data storage, and wherein to increase the number of ways, the cache controller is to reconfigure the plurality decoder to access the data storage according to a plurality of sets of ways matching the increase in the number of ways.

In Example 9, the processor of Example 1, wherein the cache controller is to employ unused tag bits in incoming addresses for use in one of least-recently used (LRU) tracking or in cyclic redundancy check (CRC) error correction of the cache entries.

Various embodiments may have different combinations of the structural features described above. For instance, all optional features of the computing system described above may also be implemented with respect to the method or process described herein and specifics in the examples may be used anywhere in one or more embodiments.

Example 10 is a system comprising: 1) a processor; 2) a cache controller coupled to the processor; and 3) a cache coupled to the cache controller, wherein the cache controller is to allocate, for a memory, a plurality of cache entries in the cache; and wherein the processor is to: a) detect an amount of the memory required for an application the processor is executing; and b) responsive to determining that the amount of the memory required is less than a maximum available amount of the memory for a computing system: i) direct the cache controller to flush the cache; and ii) direct the cache controller to increase a number of ways of the cache in which to allocate the plurality of cache entries.

In Example 11, the system of Example 10, wherein the cache is a multi-channel dynamic random-access memory (MCDRAM) memory-side cache and the cache controller is a high bandwidth memory controller.

In Example 12, the system of Example 10, wherein to increase the number ways, the cache controller is to update memory allocation to the cache from direct-mapped to set-associative.

In Example 13, the system of Example 10, wherein to increase the number of ways, the cache controller is to update memory allocation to the cache from two-way set-associative to four-way set-associative.

In Example 14, the system of Example 10, wherein the cache comprises a metadata storage coupled to the cache controller, the metadata storage to store a metadata array, wherein to increase the number of ways, the cache controller is to couple one or more additional tag comparators to the metadata storage, resulting in a number of tag comparators corresponding to the number of ways.

In Example 15, the system of Example 14, wherein the cache controller comprises a tag decoder coupled to the metadata storage, wherein to increase the number of ways, the cache controller is further to reconfigure the tag decoder to access the metadata array according to a plurality of sets of ways matching the increase in the number of ways.

In Example 16, the system of Example 10, wherein the cache further comprises a data storage coupled to the cache controller, wherein the cache controller comprises a data decoder coupled to the data storage, and wherein to increase the number of ways, the cache controller is to reconfigure the data decoder to access the data storage according to a plurality of sets of ways matching the increase in the number of ways.

Various embodiments may have different combinations of the structural features described above. For instance, all optional features of the processors and methods described above may also be implemented with respect to a system described herein and specifics in the examples may be used anywhere in one or more embodiments.

Example 17 is a method comprising: 1) allocating, by a multi-core processor of a computing system and for a memory, a plurality of cache entries in a cache of the memory; 2) detecting, by the multi-core processor, an amount of the memory installed in the computing system; and c) increasing, by the multi-core processor, a number of ways of the cache in which to allocate the plurality of cache entries, wherein the increasing is in response to detecting less than a maximum allowable amount of the memory installed in the computing system.

In Example 18, the method of Example 17, wherein, in response to the increasing, the method further comprising updating memory allocation to the cache from direct-mapped to set-associative.

In Example 19, the method of Example 17, wherein, in response to the increasing, the method further comprising updating memory allocation to the cache from four-way set-associative to eight-way set-associative.

In Example 20, the method of Example 17, further comprising: 1) detecting the amount of the memory installed after boot of the computing system; and 2) flushing the cache before increasing the number of ways of the cache.

In Example 21, the method of Example 17, wherein the multi-core processor comprises a tag comparator, and wherein, to increase the number of ways, the method further comprising coupling one or more additional tag comparators to a metadata storage, resulting in a number of tag comparators corresponding to the number of ways.

In Example 22, the method of Example 21, wherein the multi-core processor further comprises a tag decoder coupled to the metadata storage, wherein, to increase the number of ways, the method further comprising reconfiguring, the tag decoder to access a metadata array of the metadata storage according to a plurality of sets of ways matching the increase in the number of ways.

In Example 23, the method of Example 17, wherein the multi-core processor comprises a data decoder coupled to a data storage of the cache, wherein, to increase the number of ways, the method further comprising reconfiguring the data decoder to access the data storage according to a plurality of sets of ways matching the increase in the number of ways.

Various embodiments may have different combinations of the structural features described above. For instance, all optional features of the processors and methods described above may also be implemented with respect to a system described herein and specifics in the examples may be used anywhere in one or more embodiments.

Example 24 is a non-transitory computer readable storage medium storing instructions, which when executed by a multi-core processor, cause the multi-core processor to perform the operations of: 1) allocating, by the multi-core processor of a computing system and for a memory, a plurality of cache entries in a cache of the memory; 2) detecting, by the multi-core processor, an amount of the memory installed in the computing system; and 3) increasing, by the multi-core processor, a number of ways of the cache in which to allocate the plurality of cache entries, wherein the increasing is in response to detecting less than a maximum allowable amount of the memory installed in the computing system.

In Example 25, the non-transitory computer readable storage medium of Example 24, wherein the instructions, when executed, further cause the multi-core processor to perform updating memory allocation to the cache from direct-mapped to set-associative.

In Example 26, the non-transitory computer readable storage medium of Example 24, wherein the instructions, when executed, further cause the multi-core processor to perform updating memory allocation to the cache from four-way set-associative to eight-way set-associative.

In Example 27, the non-transitory computer readable storage medium of Example 24, wherein the instructions, when executed, further cause the multi-core processor to perform: 1) detecting the amount of the memory installed after boot of the computing system; and 2) flushing the cache before increasing the number of ways of the cache.

In Example 28, the non-transitory computer readable storage medium of Example 24, wherein the multi-core processor comprises a tag comparator, and wherein, to increase the number of ways, the instructions, when executed, further cause the multi-core processor to perform coupling one or more additional tag comparators to a metadata storage, resulting in a number of tag comparators corresponding to the number of ways.

In Example 29, the non-transitory computer readable storage medium of Example 28, wherein the multi-core processor further comprises a tag decoder coupled to the metadata storage, wherein, to increase the number of ways, the instructions, when executed, further cause the multi-core processor to perform reconfiguring, the tag decoder to access a metadata array of the metadata storage according to a plurality of sets of ways matching the increase in the number of ways.

In Example 30, the non-transitory computer readable storage medium of Example 24, wherein the multi-core processor comprises a data decoder coupled to a data storage of the cache, wherein, to increase the number of ways, the instructions, when executed, further cause the multi-core processor to perform reconfiguring the data decoder to access the data storage according to a plurality of sets of ways matching the increase in the number of ways.

Various embodiments may have different combinations of the structural features described above. For instance, all optional features of the processors and methods described above may also be implemented with respect to a system described herein and specifics in the examples may be used anywhere in one or more embodiments.

Example 31 is a system comprising: 1) means for allocating, for a memory, a plurality of cache entries in a cache of the memory; 2) means for detecting an amount of the memory installed in a computing system that contains the memory; and 3) means for increasing a number of ways of the cache in which to allocate the plurality of cache entries, wherein the increasing is in response to detecting less than a maximum allowable amount of the memory installed in the computing system.

In Example 32, the system of Example 31, wherein, in response to the increasing, further comprising means for updating memory allocation to the cache from direct-mapped to set-associative.

In Example 33, the system of Example 31, wherein, in response to the increasing, further comprising means for updating memory allocation to the cache from four-way set-associative to eight-way set-associative.

In Example 34, the system of Example 31, further comprising means for coupling one or more additional tag comparators of the cache to a metadata storage of the cache, resulting in a number of tag comparators corresponding to the number of ways.

In Example 35, the system of Example 34, further comprising means for reconfiguring a tag decoder of the cache to access a metadata array of the metadata storage according to a plurality of sets of ways matching the increase in the number of ways.

In Example 36, the system of Example 31, further comprising means for reconfiguring a data decoder of the cache to access a data storage of the cache according to a plurality of sets of ways matching the increase in the number of ways.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to reconfiguration memory-side cache to include additional ways depending on an amount of available memory being used, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations.

However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the above examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a microcontroller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a processor core; and
   a cache controller coupled to the processor core, the cache controller to allocate, for a memory, a plurality of cache entries in a cache; and
   wherein the processor core is to:
      detect an amount of the memory installed in one or more memory sockets of a computing system;
      determine a maximum allowable amount of memory for the computing system according to maximum capacity of the one or more memory sockets; and
      responsive to detecting less than the maximum allowable amount of memory installed in the computing system, direct the cache controller to increase a number of ways of the cache in which to allocate the plurality of cache entries.

2. The processor of claim 1, wherein the cache is a multi-channel dynamic random-access memory (MCDRAM) memory-side cache and the cache controller is a high bandwidth cache controller.

3. The processor of claim 1, wherein to increase the number ways, the cache controller is to update memory allocation to the cache from direct-mapped to set-associative.

4. The processor of claim 1, wherein to increase the number of ways, the cache controller is to update memory allocation to the cache from two-way set-associative to four-way set-associative.

5. The processor of claim 1, wherein the processor core is to further:
   detect, after boot of the computing system, the amount of the memory installed; and
   direct the cache controller to flush the cache before directing the cache controller to increase the number of ways of the cache.

6. The processor of claim 1, wherein the cache comprises a metadata storage coupled to the cache controller, the metadata storage to store a metadata array, wherein to increase the number of ways, the cache controller is to couple one or more additional tag comparators to the metadata storage, resulting in a number of tag comparators corresponding to the number of ways; and wherein the cache controller comprises a tag decoder coupled to the metadata storage, wherein to increase the number of ways, the cache controller is further to reconfigure the tag decoder to access the metadata array according to a plurality of sets of ways matching the increase in the number of ways.

7. The processor of claim 1, wherein the cache further comprises a data storage coupled to the cache controller, wherein the cache controller comprises a data decoder coupled to the data storage, and wherein to increase the number of ways, the cache controller is to reconfigure the data decoder to access the data storage according to a plurality of sets of ways matching the increase in the number of ways.

8. The processor of claim 1, wherein the cache controller is to employ unused tag bits in incoming addresses for use in one of least-recently used (LRU) tracking or in cyclic redundancy check (CRC) error correction of the cache entries.

9. A system comprising:
   a processor;
   a cache controller coupled to the processor; and
   a cache coupled to the cache controller, wherein the cache controller is to allocate, for a memory, a plurality of cache entries in the cache; and
   wherein the processor is to:
      detect an amount of the memory installed in one or more memory sockets of the system;
      determine a maximum allowable amount of memory for the system according to maximum capacity of the one or more memory sockets; and
      responsive to detecting less than the maximum allowable amount of memory installed in the system:
         direct the cache controller to flush the cache; and
         direct the cache controller to increase a number of ways of the cache in which to allocate the plurality of cache entries.

10. The system of claim 9, wherein the cache is a multi-channel dynamic random-access memory (MCDRAM) memory-side cache and the cache controller is a high bandwidth memory controller.

11. The system of claim 9, wherein to increase the number ways, the cache controller is to update memory allocation to the cache from direct-mapped to set-associative.

12. The system of claim 9, wherein to increase the number of ways, the cache controller is to update memory allocation to the cache from two-way set-associative to four-way set-associative.

13. The system of claim 9, wherein the cache comprises a metadata storage coupled to the cache controller, the metadata storage to store a metadata array, wherein to increase the number of ways, the cache controller is to couple one or more additional tag comparators to the metadata storage, resulting in a number of tag comparators corresponding to the number of ways; and wherein the cache controller comprises a tag decoder coupled to the metadata storage, wherein to increase the number of ways, the cache controller is further to reconfigure the tag decoder to access the metadata array according to a plurality of sets of ways matching the increase in the number of ways.

14. The system of claim 9, wherein the cache further comprises a data storage coupled to the cache controller, wherein the cache controller comprises a data decoder coupled to the data storage, and wherein to increase the number of ways, the cache controller is to reconfigure the data decoder to access the data storage according to a plurality of sets of ways matching the increase in the number of ways.

15. A method comprising:
   allocating, by a multi-core processor of a computing system and for a memory, a plurality of cache entries in a cache of the memory;
   detecting, by the multi-core processor, an amount of the memory installed in one or more memory sockets of the computing system;

determining, by the multi-core processor, a maximum allowable amount of memory for the computing system according to maximum capacity of the one or more memory sockets; and increasing, by the multi-core processor, a number of ways of the cache in which to allocate the plurality of cache entries, wherein the increasing is in response to detecting less than the maximum allowable amount of memory installed in the computing system.

16. The method of claim 15, wherein, in response to the increasing, the method further comprising updating memory allocation to the cache from direct-mapped to set-associative.

17. The method of claim 15, wherein, in response to the increasing, the method further comprising updating memory allocation to the cache from four-way set-associative to eight-way set-associative.

18. The method of claim 15, further comprising:
detecting the amount of the memory installed after boot of the computing system; and
flushing the cache before increasing the number of ways of the cache.

19. The method of claim 15, wherein the multi-core processor comprises a tag comparator, and wherein, to increase the number of ways, the method further comprising coupling one or more additional tag comparators to a metadata storage, resulting in a number of tag comparators corresponding to the number of ways; and wherein the multi-core processor further comprises a tag decoder coupled to the metadata storage, wherein, to increase the number of ways, the method further comprising reconfiguring the tag decoder to access a metadata array of the metadata storage according to a plurality of sets of ways matching the increase in the number of ways.

20. The method of claim 15, wherein the multi-core processor comprises a data decoder coupled to a data storage of the cache, wherein, to increase the number of ways, the method further comprising reconfiguring the data decoder to access the data storage according to a plurality of sets of ways matching the increase in the number of ways.

* * * * *